(12) United States Patent
Gamache

(10) Patent No.: US 11,067,467 B2
(45) Date of Patent: Jul. 20, 2021

(54) FITTING ASSEMBLY WITH LEAK DETECTION FOR ANALYTICAL SYSTEMS

(71) Applicant: MÉCANIQUE ANALYTIQUE INC., Thetford-Mines (CA)

(72) Inventor: Yves Gamache, Thetford-Mines (CA)

(73) Assignee: MÉCANIQUE ANALYTIQUE INC., Thetford-Mines (CA)

( * ) Notice: Subject to any disclaimer, the term of this patent is extended or adjusted under 35 U.S.C. 154(b) by 463 days.

(21) Appl. No.: 15/758,340

(22) PCT Filed: Sep. 8, 2016

(86) PCT No.: PCT/CA2016/051061
§ 371 (c)(1),
(2) Date: Mar. 7, 2018

(87) PCT Pub. No.: WO2017/041175
PCT Pub. Date: Mar. 16, 2017

(65) Prior Publication Data
US 2018/0246003 A1 Aug. 30, 2018

Related U.S. Application Data

(60) Provisional application No. 62/215,346, filed on Sep. 8, 2015.

(51) Int. Cl.
*G01M 3/22* (2006.01)
*F16L 19/10* (2006.01)
*F16L 19/12* (2006.01)

(52) U.S. Cl.
CPC .......... *G01M 3/223* (2013.01); *F16L 19/103* (2013.01); *F16L 19/12* (2013.01); *F16L 2201/30* (2013.01)

(58) Field of Classification Search
CPC ...... G01M 3/223; F16L 2201/30; F16L 19/12; F16L 19/103; F16L 19/061; F16L 33/2071; F16L 33/226; F16L 33/2078
See application file for complete search history.

(56) References Cited

U.S. PATENT DOCUMENTS 3,069,188 A * 12/1962 Crawford .............. F16L 19/103
285/342
3,134,615 A * 5/1964 Cator ...................... F16L 19/08
285/341

(Continued)

FOREIGN PATENT DOCUMENTS

| CN | 202213801 | 5/2012 |
| WO | WO 2009/003016 | 12/2008 |

OTHER PUBLICATIONS

Office Action for CN 201680061857.1 dated Jul. 26, 2019.
Supplementary Search Report for EP 16843330.8 dated May 23, 2019.

*Primary Examiner* — Tran M. Tran
(74) *Attorney, Agent, or Firm* — Michael Downs; Downs IP Law LLC

(57) ABSTRACT

An improved fitting assembly for analytical devices is provided. The fitting assembly includes a tube securable to a fitting component via rear and front ferrules and a nut. The fitting component includes a body having a cavity for receiving the tube and ferrules. The body also includes a channel connecting the cavity to a leak chamber defined in a space between the tube, the fitting component and the inner sidewall of the nut body, the leak chamber being in fluid communication with the exterior of the nut body via the channel in the nut body. Sealing elements are provided between the tube and nut for encouraging leaks to flow through the leak path. A method for detecting leaks in the fitting assembly is also provided.

25 Claims, 20 Drawing Sheets

(56) References Cited

U.S. PATENT DOCUMENTS

| | | | | |
|---|---|---|---|---|
| 3,486,775 A * | 12/1969 | Callahan, Jr. | ......... | F16L 19/061 285/348 |
| 3,584,900 A * | 6/1971 | Lennon | ................. | F16L 19/103 285/14 |
| 3,986,730 A * | 10/1976 | Martelli | ................. | F16L 19/075 285/23 |
| 4,304,422 A * | 12/1981 | Schwarz | ............... | F16L 19/103 285/341 |
| 4,422,675 A * | 12/1983 | Norris | ..................... | F02C 7/222 285/123.1 |
| 4,775,855 A * | 10/1988 | Cox | ......................... | F17D 5/04 137/552.7 |
| 4,893,846 A * | 1/1990 | McGraw | ............... | F16B 7/0426 285/133.4 |
| 5,074,599 A * | 12/1991 | Wirbel | .................... | F16L 47/04 285/93 |
| 5,114,190 A * | 5/1992 | Chalmers | .............. | F16L 25/023 285/247 |
| 5,217,261 A * | 6/1993 | DeWitt | ................. | F16L 19/065 285/332.2 |
| 5,263,312 A * | 11/1993 | Walker | ..................... | F02C 7/25 285/13 |
| 5,388,871 A * | 2/1995 | Saitoh | ................. | F16L 19/0218 285/247 |
| 5,472,244 A * | 12/1995 | Nishikata | ................ | F16L 19/02 285/321 |
| 5,482,618 A * | 1/1996 | Hall | ....................... | B01D 35/02 210/85 |
| 5,735,553 A * | 4/1998 | Niemiec | ............. | F16L 19/0212 285/101 |
| 5,882,050 A * | 3/1999 | Williams | ................ | F16L 19/10 285/343 |
| 5,904,376 A * | 5/1999 | Yuen | ..................... | F16L 33/223 285/148.19 |
| 6,314,795 B1 * | 11/2001 | Ingham | ............... | G01M 3/2823 73/49.1 |
| 6,851,729 B2 * | 2/2005 | Gibson | ................. | F16L 19/103 285/341 |
| 6,889,538 B2 * | 5/2005 | Booles | ................. | G01M 3/283 285/93 |
| 7,150,473 B2 * | 12/2006 | Sandborn | ................ | F16L 37/08 285/14 |
| 7,497,483 B2 * | 3/2009 | Williams | ................ | F16L 19/06 285/341 |
| 7,614,668 B1 * | 11/2009 | Williams | ................ | F16L 19/10 285/249 |
| 7,692,553 B2 * | 4/2010 | Kubala | ................ | B23Q 11/103 285/121.1 |
| 7,695,027 B2 * | 4/2010 | Williams | ................ | F16L 19/06 285/342 |
| 8,007,013 B2 * | 8/2011 | Arstein | ................ | F16L 19/061 285/342 |
| 8,272,671 B2 * | 9/2012 | Becker | .................... | F16L 19/12 285/249 |
| 8,439,404 B2 | 5/2013 | Anton | | |
| 8,573,653 B2 * | 11/2013 | Gamache | .............. | F16L 19/065 285/342 |
| 8,876,170 B2 * | 11/2014 | Williams | .............. | F16L 19/103 285/342 |
| 8,931,808 B2 | 1/2015 | Graham | | |
| 9,016,732 B2 * | 4/2015 | Bearer | .................. | F16L 19/061 285/342 |
| 9,377,148 B2 * | 6/2016 | Barnes | ................. | F16L 58/181 |
| 9,562,635 B2 * | 2/2017 | Williams | ................ | F16L 19/06 |
| 9,851,032 B2 * | 12/2017 | Williams | .............. | F16L 19/103 |
| 10,024,468 B2 * | 7/2018 | Trivett | ................ | F16L 19/103 |
| 10,060,560 B2 * | 8/2018 | Belanger | ................ | G01N 30/60 |
| 10,184,600 B2 * | 1/2019 | Come | ................... | F16L 19/075 |
| 10,295,093 B2 * | 5/2019 | Anton | .................... | F16L 19/061 |
| 10,520,118 B2 * | 12/2019 | Mcentyre | ............... | F16L 19/103 |
| 10,578,503 B2 * | 3/2020 | Rubinski | ............... | F16L 19/103 |
| 10,584,814 B2 * | 3/2020 | Brown | .................. | F16L 19/103 |
| 2001/0054821 A1 * | 12/2001 | Volcansek | ............ | F16L 19/103 285/382.7 |
| 2003/0197378 A1 | 10/2003 | Allstead et al. | | |
| 2007/0001448 A1 * | 1/2007 | Navarro | ................ | F16L 33/223 285/249 |
| 2008/0007050 A1 * | 1/2008 | Williams | ................ | F16L 19/086 285/249 |
| 2010/0140932 A1 * | 6/2010 | Williams | ................ | F16L 19/061 285/389 |
| 2010/0194107 A1 * | 8/2010 | Marshall | ................ | F16L 19/103 285/382.7 |
| 2015/0362101 A1 * | 12/2015 | Bearer | .................. | F16L 19/061 285/343 |
| 2018/0347731 A1 * | 12/2018 | Kesler | ................. | F16L 19/0218 |

\* cited by examiner

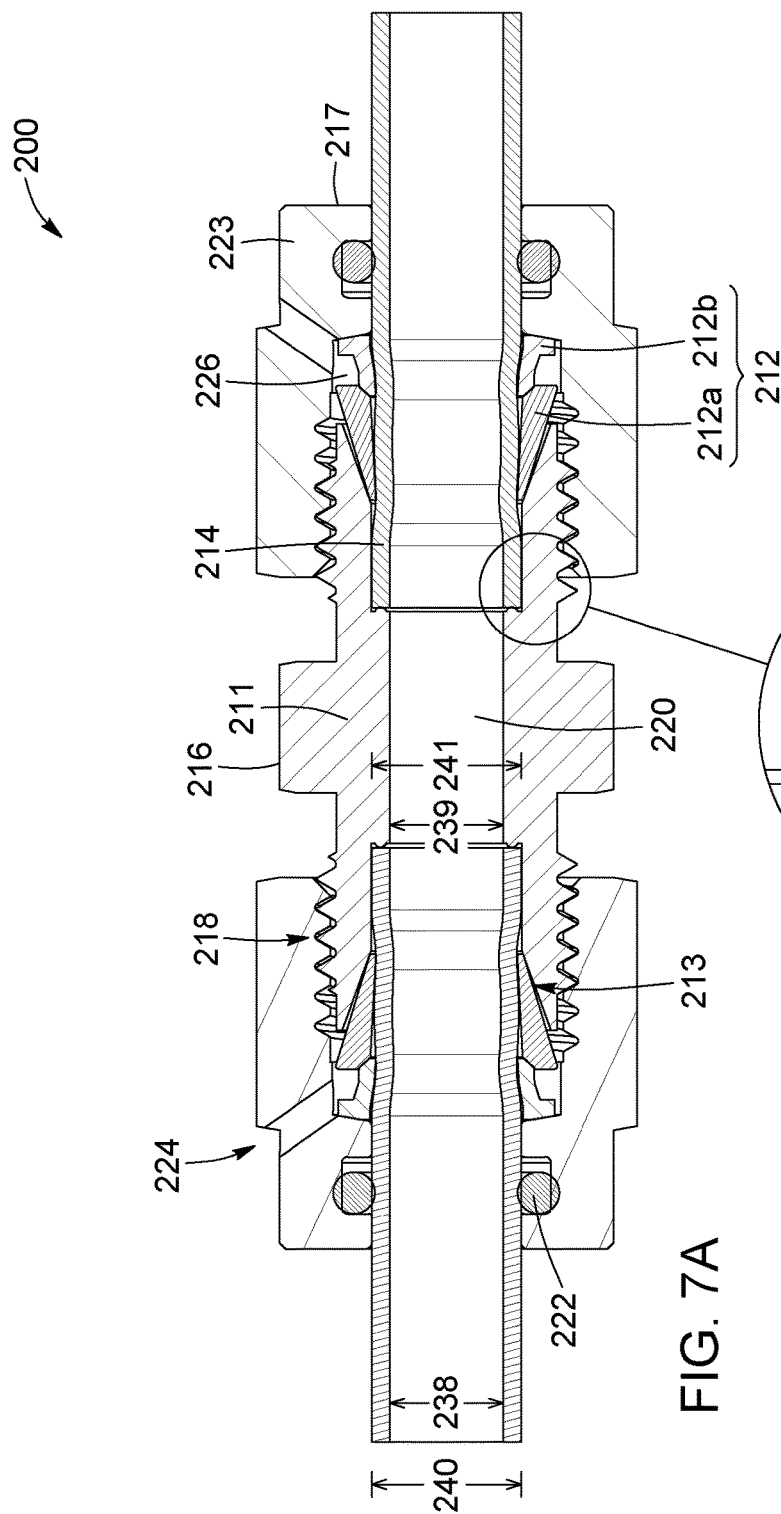
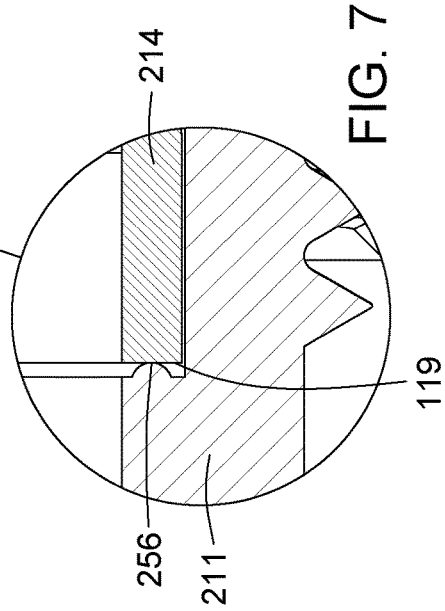
FIG. 7A
FIG. 7B

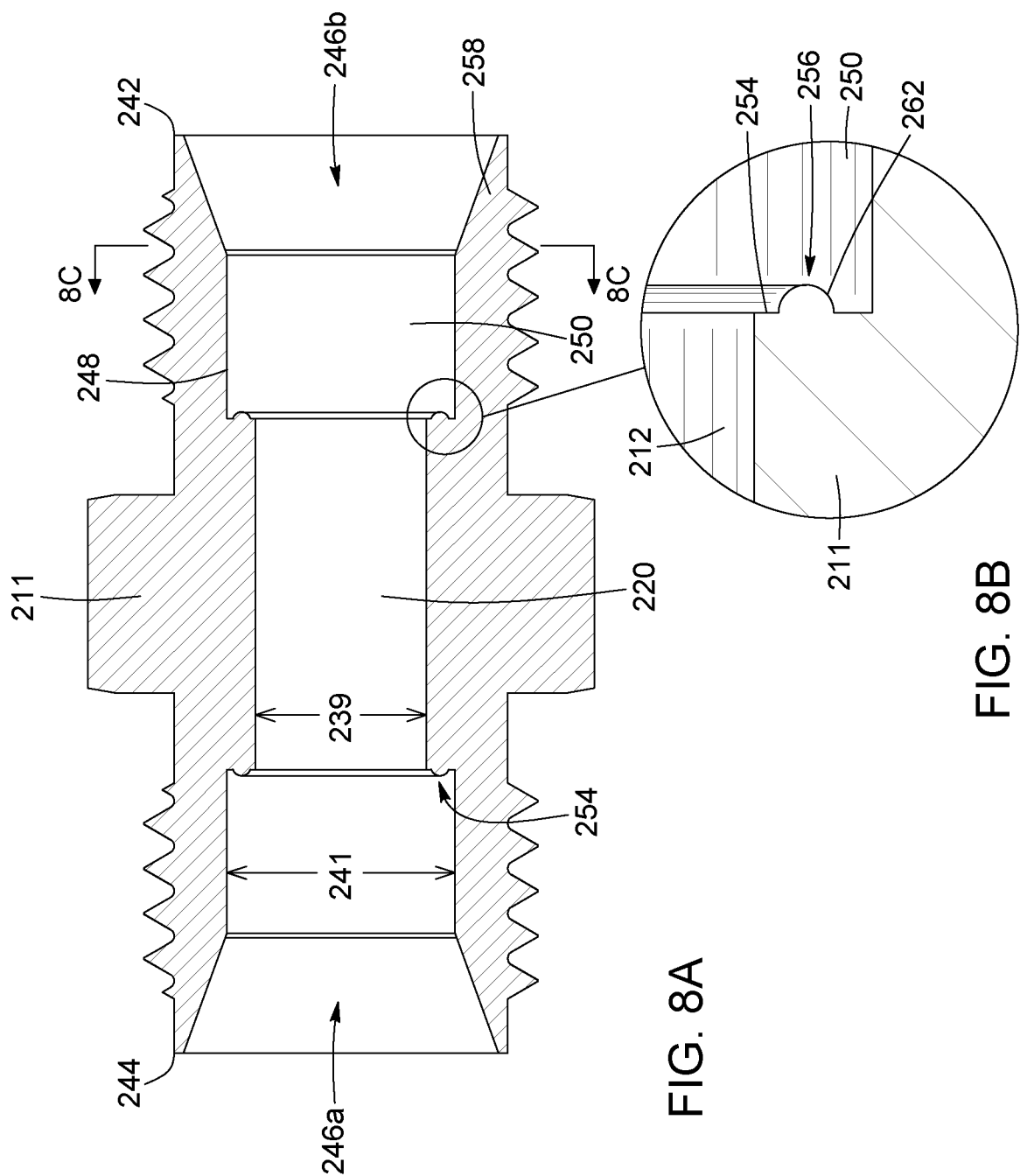

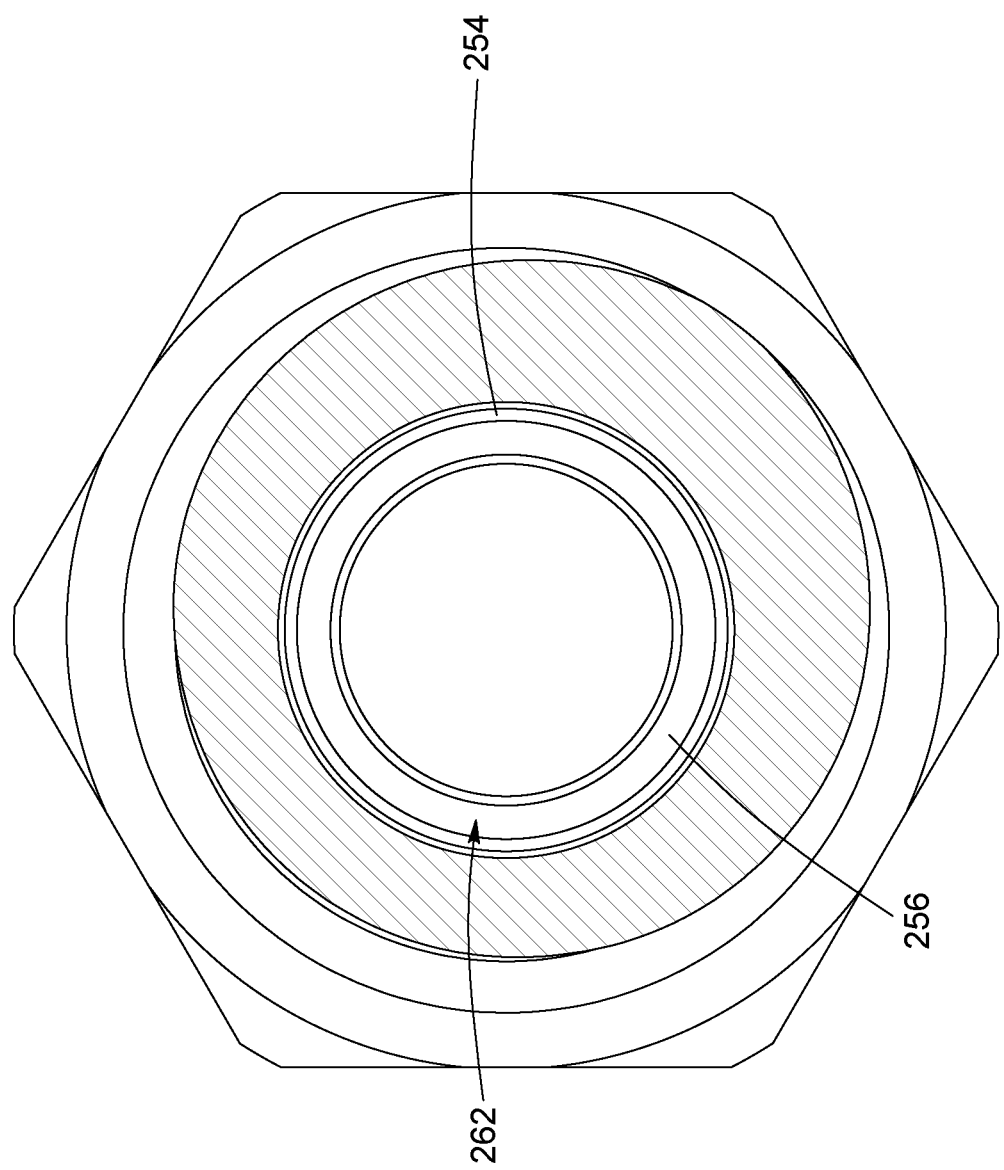

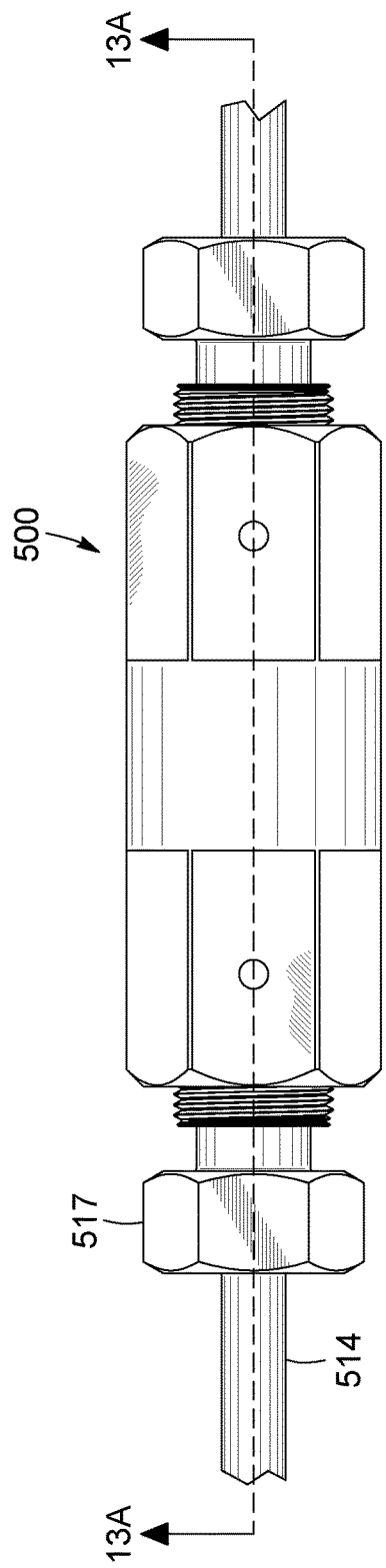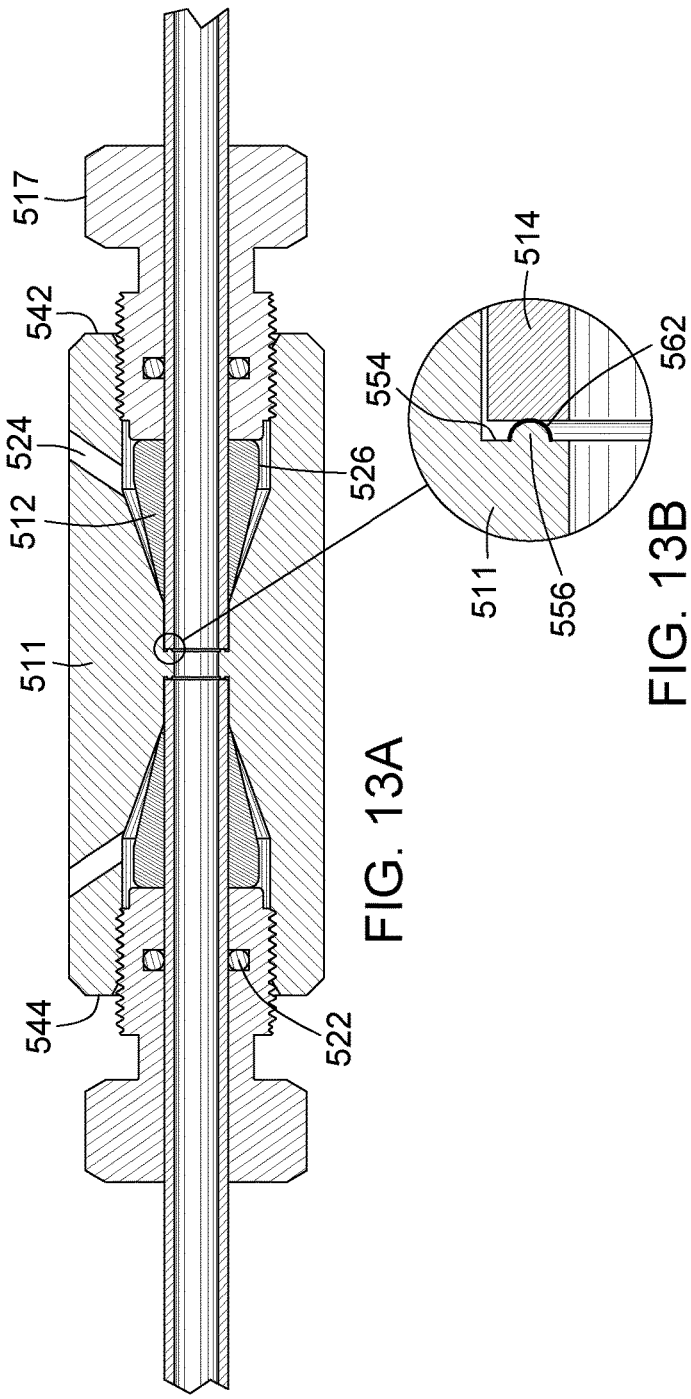

11,067,467 B2

FITTING ASSEMBLY WITH LEAK DETECTION FOR ANALYTICAL SYSTEMS

TECHNICAL FIELD

The present invention generally relates to analytical devices, fitting component and unions, and more particularly concerns a compression fitting component adapted to receive and connect a tube and means for detecting leaks therein.

BACKGROUND

Fitting components and unions are commonly used to sealingly connect a tube to another device, to another tube, or simply to cap the tube. When used in analytical systems, fitting components and unions are most often used to sealingly connect two tubes together, in order to allow leak-tight fluid communication between the tubes. Fitting components can also be part of analytical devices and actuating mechanism for receiving different types of tubing.

One common type of fitting assembly 10 is shown in FIGS. 1 and 1A (PRIOR ART). A double ferrule 12, formed by a front ferrule 12a and a back ferrule 12b, pinches a tube 14 near its extremity, creating a bulge 13 frontward of the ferrule 12, commonly known as a "swaging" of the tube 14. This swaging provides a good grip on the tube 14.

Double ferrule fitting assemblies are largely used in industrial applications such as in high pressure systems and/or in applications in which there is a high level of vibration. The bulging extremity of the tube 14 makes it very difficult to remove the tube 14 from the fitting 16 and thus creates a safe, seal-tight connection.

The widespread use of double ferrule fitting assemblies in industrial applications, along with their widespread availability, has led analytical system designers to use them in analytical instruments and sampling systems. However, as will be described in the following paragraphs, such fitting designs can be problematic for instruments manufacturers, system integrators and sampling system builders.

Packed columns in gas chromatographic instruments must often be changed. A common reason for replacing the columns is the need for measuring new types of impurities in a new sample background. The outside diameter (OD) of these columns is typically of either 1/16" OD or 1/8" OD, and less frequently of 1/4" OD.

Referring to FIG. 1A, it is the "swaging" action of the tube 14 within the fitting 16 that grips the tube 14 and forms a seal. In order to form a proper seal, a relatively high amount of torque is required in order to tighten the nut 17 so that the ferrules 12 deform the tube 14. The amount of torque required increases every time the tube 14 is inserted and removed from the fitting 16. When increasing the torque, the tubing 14 is forced deeper into the body of the fitting 16, although at some point the tube 14 cannot be moved forward, and its outside diameter cannot become larger, since the tube 14 is surrounded by the body of the fitting. With frequent assembly and disassembly of the tube 14 and the fitting 16, it becomes more and more difficult to pull out the tube 14 from the fitting 16, and even more difficult to re-insert the tube back in the fitting 16. This frequent assembly/disassembly of the tube 14 and the fitting 16 can create scratches inside the fitting 16 which in turn generates particles and eventually creates leaks at these locations.

In order to overcome these problems, mainly for analytical applications, one practice consists of cutting the tube 14 just frontward of the front ferrule 12a or slightly withdrawing the tube 14 before tightening the nut 17 in order to reduce the bulging of the tube. While this practice makes it easier to remove and reinsert the tubes within the fitting, it eliminates by the same occasion the safety properties, i.e. tolerance to very high pressure and vibration caused by the swaging in the double ferrule type fitting. Even worse, this practice leads to another problem which consists of the creation of larger dead volumes.

In trying to resolve the problem caused by the "swaging" of double ferrule fittings, users have created a problem difficult to deal with, which are larger dead volumes. Indeed, by cutting/withdrawing the tubing 14, a larger volume between the extremity of the tube and the back, or seating portion, of the fitting is created since the space or volume previously occupied by the tubing is left empty.

With reference to FIG. 2, a simple gas chromatography (GC) system 1 is shown. In this case, the dead volume is present on both sides of the column since there is a fitting 10 on each end of the column. These dead volumes become problematic when there is a low carrier flow. Indeed, this will generate chromatographic peak broadening. Problems caused by scratches and generated particles are relatively easy to detect. However, problems caused by dead volumes are much more subtle, and can sometimes be mistakenly identified as leaks. In fact, dead volumes are often referred to as virtual leaks.

Still referring to FIG. 2, a sample gas 4 is injected on a separation column to separate the impurities and then to measure them by the integration of successive signal peaks by the detector 2, as well known in the art. The sample loop is swept by the sample gas 4, while the separation column and the detector 2 are swept by the carrier gas 3. In this example, the carrier 3 is helium, the column has an outer diameter (OD) of 1/8", a molecular sieve is used, and the detector 2 is of the helium ionisation type. Such configuration is commonly used for permanent gas measurements. Each side of the column is provided with a double ferrule fitting 10, similar to the one illustrated in FIG. 1A. After starting up the system 1, helium is circulated and the column is regenerated to purge away any contaminants.

FIGS. 3 and 4 are graphs showing the level of impurities in parts per million (ppm) detected as function of the time in minutes. FIG. 3 shows the signal of the detector of the system 1 from FIG. 2, after the system has stabilized, while FIG. 4 shows the effect of varying the flow of the carrier on the detecting signal. In this case the variation consists of decreasing the flow of the carrier and then of restoring it. When carrier flow is decreased, the signal increases due to the presence of accumulated gas in the dead volumes, this accumulated gas diffusing back into the carrier. The presence of accumulated gas in the carrier increases the impurity level into the detector, thus increasing the detecting signal.

Restoring the flow of the carrier in the system dilutes the impurity level into the carrier gas, causing the signal to decrease. As it can be observed in the graphic of FIG. 4, the signal is lower after the restoration of the flow, in comparison to the signal at the beginning of the trend. This situation can be explained by the fact that there is less contaminant entrapped in the dead volume. Varying a system flow or pressure is a known method for finding leaks in gas chromatography system. However, when analyzing the signal trend of FIG. 4, one could think that there is leak and/or air diffusion in the system. A person skilled in the art would typically retighten the fittings until the signal decreases.

By retightening the fittings, the ferrules are pushed forward in the body of the fitting and the outer diameter of the tubing increases once again, thus decreasing the dead volume. By doing so, the entrapped contaminant is forced back into the carrier gas and detector.

Now referring to the graphic of FIG. 5, the signal shown illustrates the result of this action. Varying the flow or pressure to crosscheck for leaks would again generate a signal similar to the one illustrated in FIG. 4, but with less amplitude. Again, with the best intention in mind, an operator observing this would once again retighten the fittings, believing there are still leaks. The fact that there are also unions and other fittings at various locations in the system makes this problem even more difficult to track, identify and resolve. In the end, in attempting to resolve these virtual leaks, fittings will become over-tightened, and real leaks can be generated.

FIGS. 6, 6A and 6B show a single ferrule fitting assembly 100 commonly used in gas chromatography systems. The single ferrule 112 used in such an assembly 20 does not cause a "swaging" action, and the extremity of the tube 114 does not bulge out for holding the tube 114 in place in the body of the fitting 116. When the nut 117 is screwed in the fitting 116, the front edge of the ferrule 112 will grip the tube 115, creating a first sealing area. Another sealing point 115 is obtained between the external surface of the ferrule 112, and the internal surface of the fitting 116. The torque required to screw the nut 117 and push the ferrule 112 frontward in the fitting 116 is generally smaller than the torque required in the double ferrule design. In the double ferrule design, it requires extra torque in order to properly deform the tubing. With single ferrule fittings such as the fitting 116 shown in FIG. 6A, there is normally no deformation of the tube 114. In other words, the portion of the tube extending frontward of the ferrule 112 stays round and straight. The bottom or seating flange of the fitting 116 is where the square end of the tube seats within the fitting.

Best shown in FIG. 6B, the single ferrule fitting minimizes the formation of a dead volume precisely because the deformation of the tube 114 is reduced or eliminated. In order to prevent the tube 114 from being deformed, its diameter must be small enough so that the tube 114 can be slipped and fitted just tightly enough in the inner section of the fitting. Furthermore, the end of the tube 114 must be cut orthogonally, and have a clean and neat finish, in order to create a proper sealing surface with the corresponding squared bottom of the fitting.

Single ferrule fittings generally provide adequate results when the tubing size is smaller than ⅛" OD. As such, these fittings are sometimes referred to as "zero dead volume" fittings. However, a dead volume is still present in the fitting when in use, even if it is a small one. In particular applications, where high sensitivity systems are used, such as mass spectrometers and plasma emission detectors, the effect of small dead volumes can be observed.

Still referring to FIG. 6B, the dead volume 119a corresponds to the clearance between the outside diameter of the tube 114 and the internal surface of the aperture of the fitting 116. This dead volume 119a, no matter how small, will eventually be filled with fluid. It should be remembered that the diameter of the molecule of Helium is about 0.25 nm, Helium being a carrier commonly used in analytical systems. There is also a larger space or dead volume 119b located between the contact point 115 of the ferrule with the body of the fitting and the location where the tube enters into the fit-in zone, ie where the tube 114 extends out of the ferrule 117. When temperature or pressure suddenly changes, these various volumes will eventually be filled with fluid.

In light of the above, there is a need for improving fitting assembly for sealing a tube in a fitting component, may it be a valve cap, a union or an actuating mechanism. There is also a need to further reduce dead volumes in fitting components.

SUMMARY

An object of the present disclosure is to provide a fitting assembly addressing at least one of the above-mentioned needs.

According to an aspect, a fitting assembly is provided. The fitting assembly includes a fitting component, a tube, ferrules and a nut. The tube has a tube end for insertion through the nut and ferrule, and a fit-in end corresponding to a portion of the tube end extending past the ferrule. The tube is securable to the fitting component via the ferrule and nut. The fitting component includes a fitting component body having first and second extremities. The fitting component body includes a cavity for receiving the tube end and the ferrule. The cavity is defined by inner lateral walls and opens on the first extremity of the body. The cavity includes a fit-in receiving section for receiving the fit-in end of the tube. The body also includes a channel in fluid communication with the cavity. The channel has a diameter smaller than a diameter of the fit-in receiving section. A radial annular flange is located at an interface of the fit-in receiving section with the channel. The flange has an annular sealing lip protruding towards the cavity, the sealing lip being coated with an inert substance and being for forming a seal with a radial surface of the fit-in.

In an embodiment, the fitting assembly is for use in an analytical system, to secure a tube. The fitting assembly comprises the fitting component, a front ferrule and a rear ferrule and the nut for securing the tube to the fitting component. The fitting component receives an end of the tube, The fitting component has a fitting component body comprises inner lateral walls that define a cavity extending axially through the fitting component body. The cavity has a tube-receiving section open at a first end (or outer end) for receiving the end of the tube therein; and a radial annular flange at a second end (or inner end) of the cavity for abutting a rim of the end of the tube. The front and rear ferrules are ring-shaped with a central bore sized to receive the tube there-through. The nut secures the tube to the fitting component and engages with the fitting component, biasing the front and rear ferrules to deform the tube. The nut has a nut body with first and second ends which are preferably proximate the first and second end of the fitting component. The nut body comprises an inner sidewall and an outer sidewall extending between the first and second ends, the inner sidewall defining a bore opening at the first and second ends. The bore is sized to receive the tube therethrough. The nut also comprises a fitting interface at its first end for engaging with the fitting component, a tube interface at its second end for fitting around the tube, and a channel (224) extending through the nut body, between the inner sidewall and the outer sidewall, said channel providing a path for fluid between the bore and an exterior of the nut body. When the nut secures the tube to the fitting component, a leak chamber is defined in a space between the tube, the fitting component and the inner sidewall of the nut body, the leak chamber being in fluid communication with the exterior of the nut body via the channel in the nut body.

In an embodiment, the fitting assembling includes a front ferrule and a rear ferrule compressed between the nut and the fitting component. The front ferrule is biased so as cause a deformation of the tube between the front ferrule and the channel of the fitting component body.

In an embodiment, the tube, nut and fitting component together define a leak chamber adjacent an interface of the tube and the fitting component. A sniffing hole is provided through the nut body or through the fitting component body for allowing fluid communication between the leak chamber and an exterior of the fitting assembly for facilitating leak detection.

In an embodiment, a septum is provided in the sniffing hole for containing gases in the leak chamber and for allowing leaked gases to accumulate therein. The septum can be configured to allow insertion of a probe therethrough.

In an embodiment, the nut includes a nut body with inner and outer nut sidewalls extending between a fitting interface end and a tube interface end, the inner sidewalls defining a bore. The sniffing hole includes a sniffing channel extending through the inner and outer nut sidewalls and fluidly communicating with the cavity.

In an embodiment, the sniffing channel is sloped upwards away from the fitting interface end.

In an embodiment, the fitting assembly further comprises a sealing element between the nut and the tube for containing leaks within the leak chamber and encouraging a leak flow path through the sniffing hole.

In an embodiment, the sealing element is a sealing ring provided along the inner nut sidewall.

According to an aspect, a fitting assembly kit is provided. The kit includes a combination of at least some of the above-described fitting component, tube, ferrule and nut.

According to an aspect, a fitting component is provided. The fitting component includes a body with a first end and a second end. At least one of the first and second ends is configured to receive a tube, ferrule and nut, and to form a leak chamber therewith. A sniffing hole is provided in the fitting component body for allowing fluid communication between the leak chamber and an exterior of the fitting component.

According to an aspect, a nut is provided. The nut comprises a body with a tube interface end, a fitting component interface end, and a bore extending therethrough. The bore is shaped to receive a tube therethrough, receive a ferrule and an end of a fitting component therein, and form therewith a leak chamber. A sniffing hole is provided in the nut body for allowing fluid communication between the leak chamber and an exterior of the nut.

In an embodiment, the nut comprises inner sidewalls defining the bore, the inner sidewalls comprises a threaded portion for interfacing with a threaded section of the fitting component, and a non-threaded section for forming the leak chamber. The sniffing hole comprises a channel extending through the nut body and opening on the inner sidewalls of the nut in the non-threaded section.

According to another aspect, a method for detecting a leak in a fitting assembly is provided. A tube is secured in a fitting component. The tube is secured via a nut, the tube extending through a central bore in the nut, and the nut engaging with the fitting component to bias an end of the tube towards the fitting component. According to the method, fluid is passed through the tube. A fluid leaking is directing from an interface between the end of the tube and the fitting component into a leak chamber in an interior portion of the nut, by sealing an interface between the tube and the nut and by sealing an interface between the nut and the fitting component. The fluid from the leak chamber is sampled and a determination is made whether the fluid sampled from the leak chamber contains traces of the fluid passed through the tube, the presence of said traces indicating the existence of the leak in the fitting assembly.

As can be appreciated, the fitting assembly described herein combines the analytical performance of a lip-seal fitting assembly with the mechanical robustness of a "swaging" fitting assembly. This allows for a single type of fitting to be used in both analytical and industrial applications. The components of the fitting assembly are shaped, sized and configured to create a leak chamber defined in a space between the tube, the fitting component and the inner sidewall of the nut body. The leak chamber is in fluid communication with the channel provided in the nut, and can be closed by placing a septum or other similar plug in the channel, or it can be connected to an analytical detector to detect impurities and sample molecules trapped in the leak chamber. The present invention is particularly adapted in analytical systems, for tube diameters varying from $1/16"$ OD to $1/8"$ OD.

BRIEF DESCRIPTION OF THE DRAWINGS

FIG. 7A is a cross-section view of the fitting of FIG. 7, taken along line 7A-7A. FIG. 7B is a detail view of FIG. 7A showing the sealing lip interfaced with a tube.

FIG. 8A is a detail view of the fitting of FIG. 8. FIG. 8B is a detail view of the fitting FIG. 8A, showing the sealing lip without a tube. FIG. 8C is a cross section view of the fitting of FIG. 8A, taken along line 8C-8C.

FIG. 13 is a side view of a single ferrule union fitting, according to an embodiment. FIG. 13A is a cross section view of the fitting of FIG. 13 taken along line 13A-13A. FIG. 13B is a detail view of FIG. 13A showing the sealing lip interfaced with a tube.

DETAILED DESCRIPTION

Figure 1:
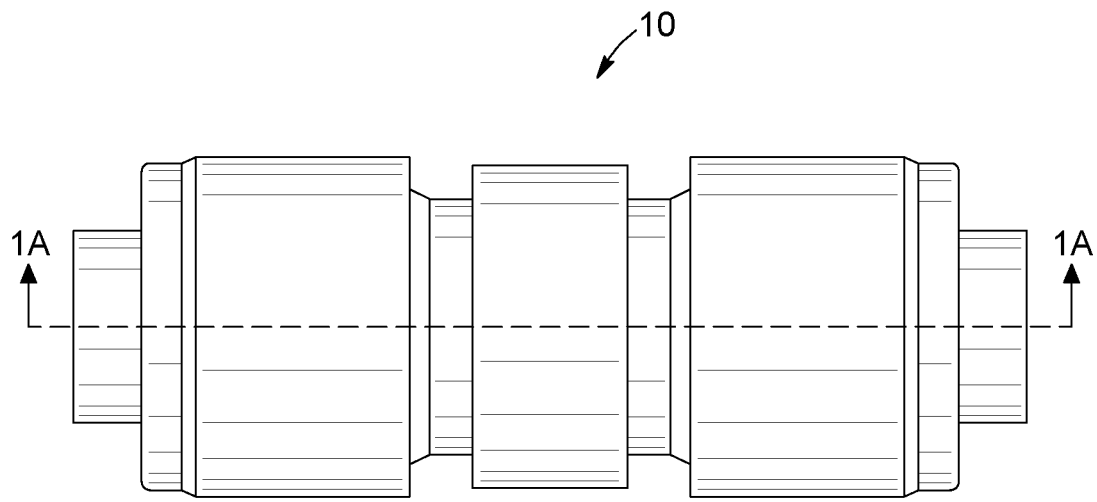
FIG. 1 is a side view of a prior art double ferrule fitting.
Figure 1A:
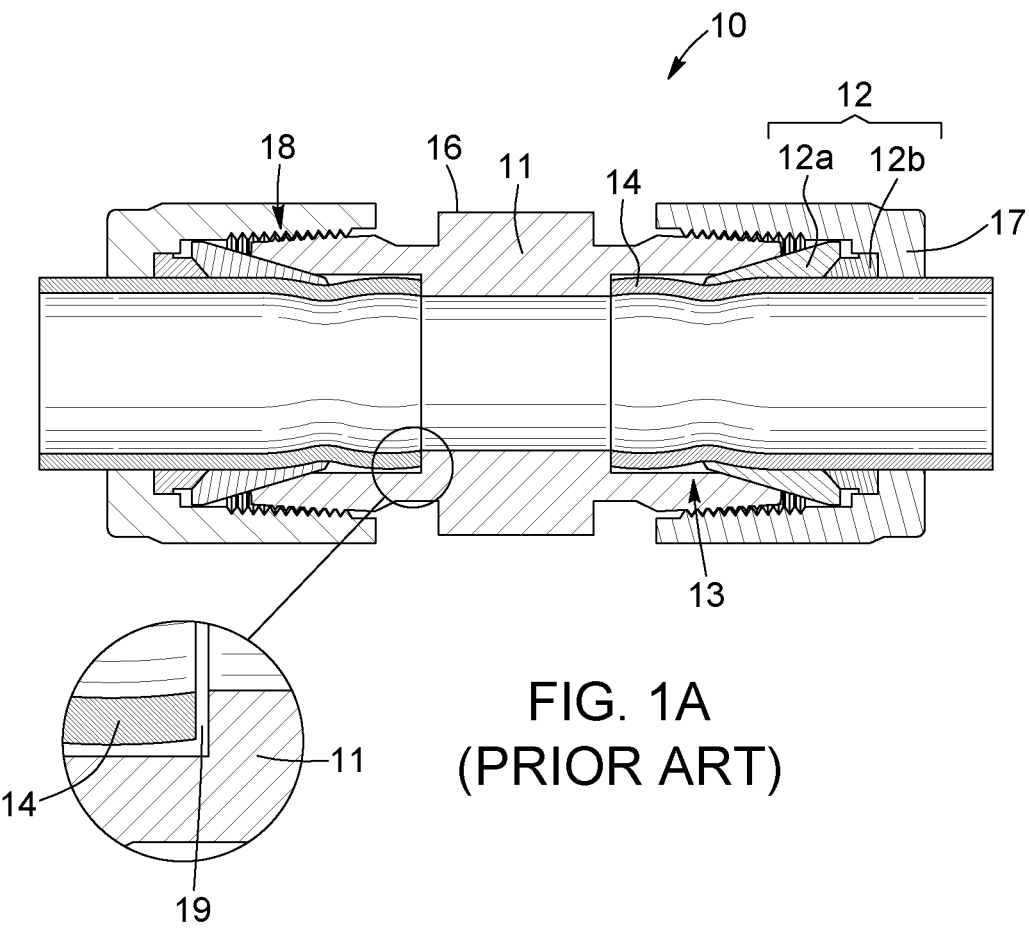
FIG. 1A is a cross-section view of the double ferrule fitting of FIG. 1, taken along line 1A-1A. (PRIOR ART)
Figure 2:
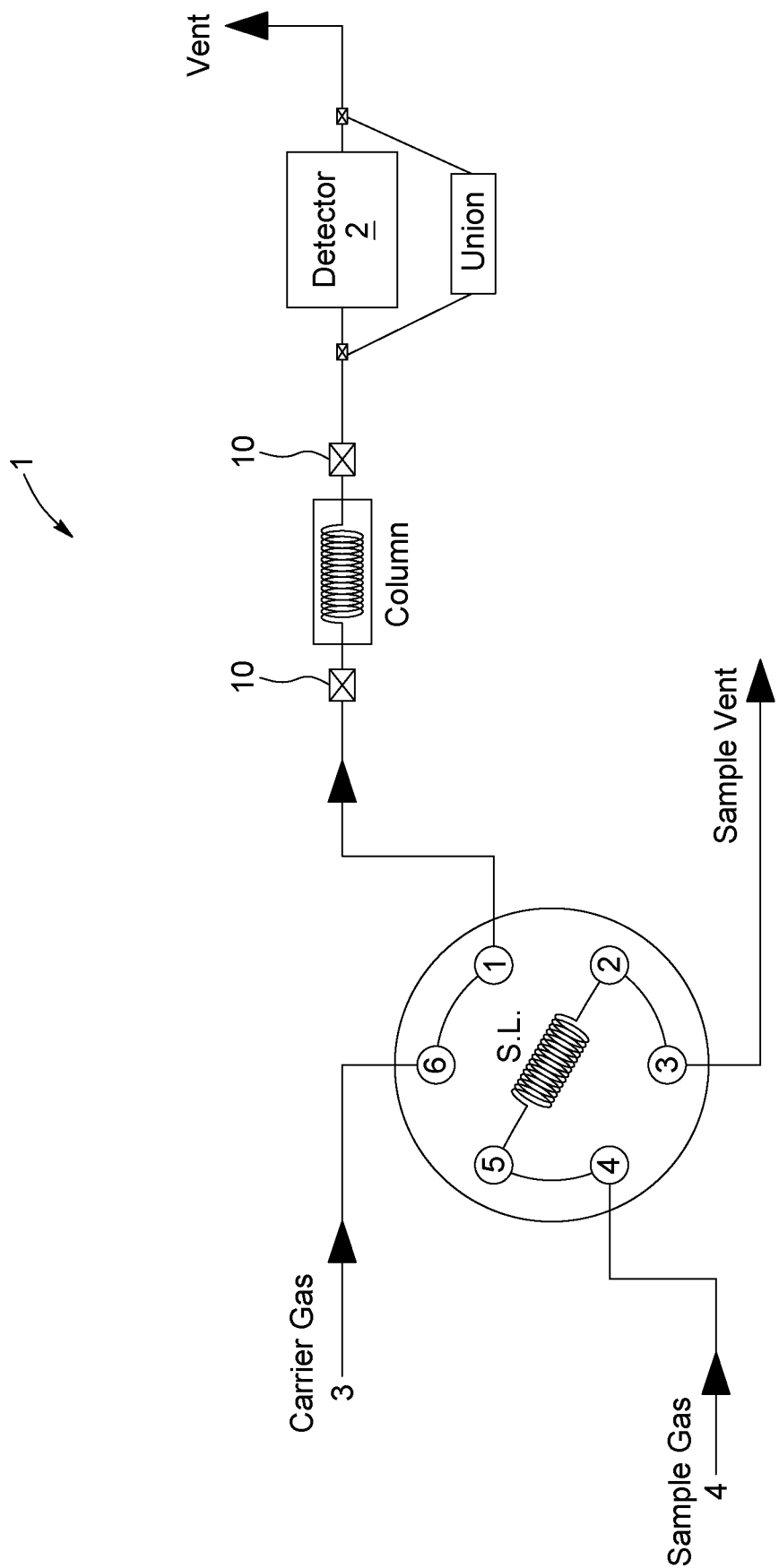
FIG. 2 is a schematic view showing a typical gas chromatography system. (PRIOR ART)
Figure 3:
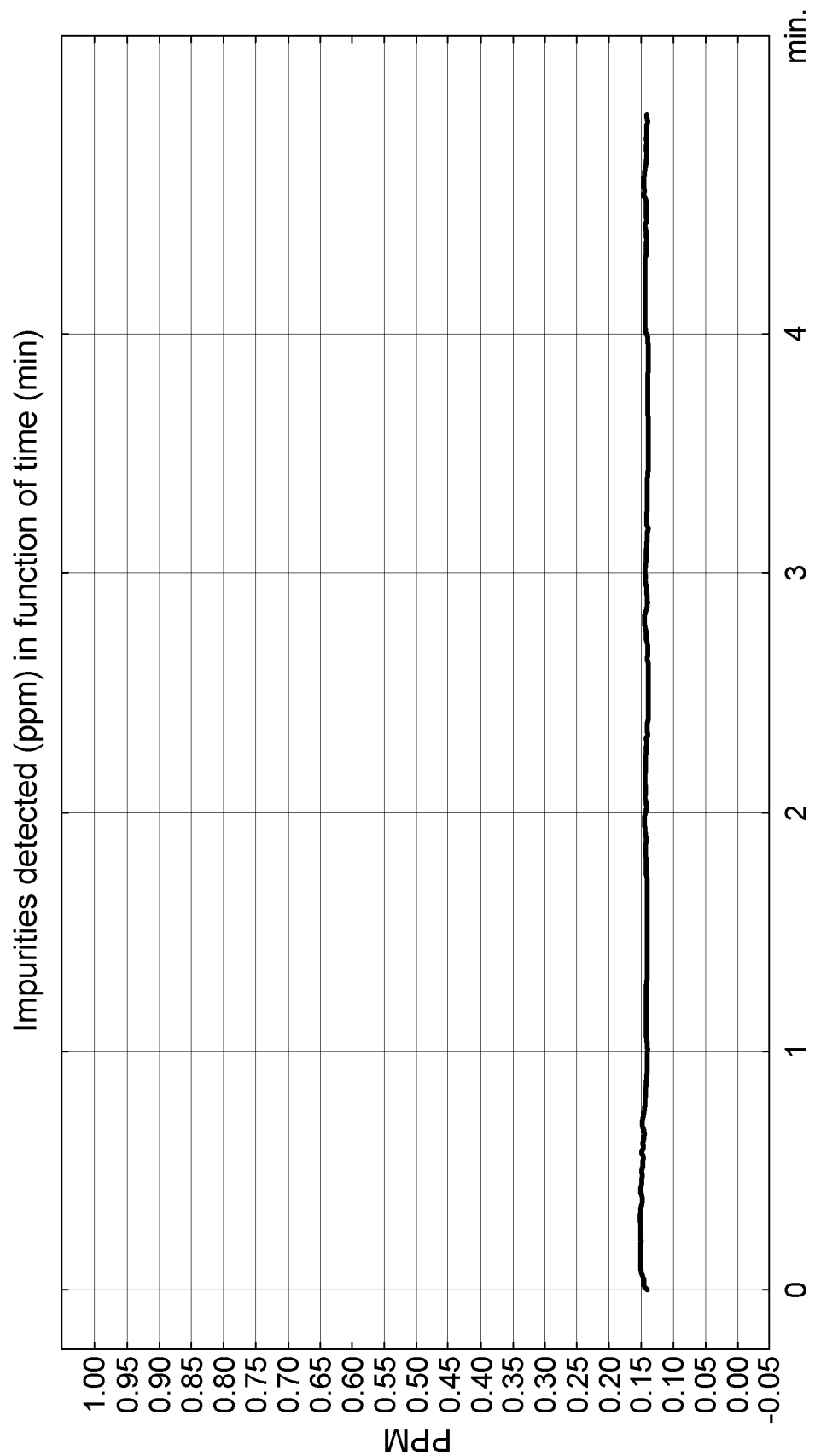
FIG. 3 is a graph showing impurities detected (in ppm) in function of time, after system stabilization, using a prior art fitting. (PRIOR ART)
Figure 4:
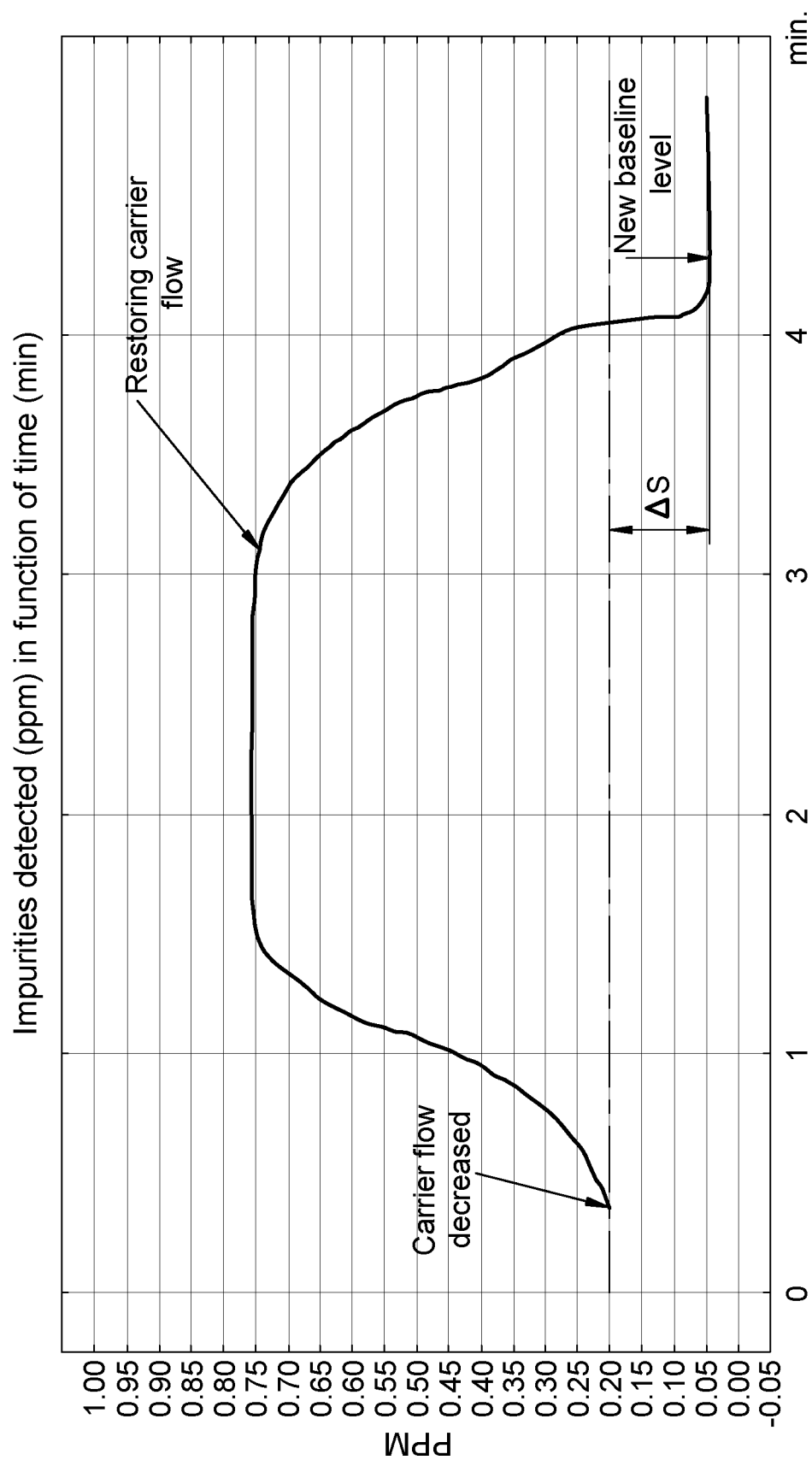
FIG. 4 is a graph showing impurities detected (in ppm) as a function of time, when the carrier flow is decreased and then restored, using a prior art fitting. (PRIOR ART)
Figure 5:
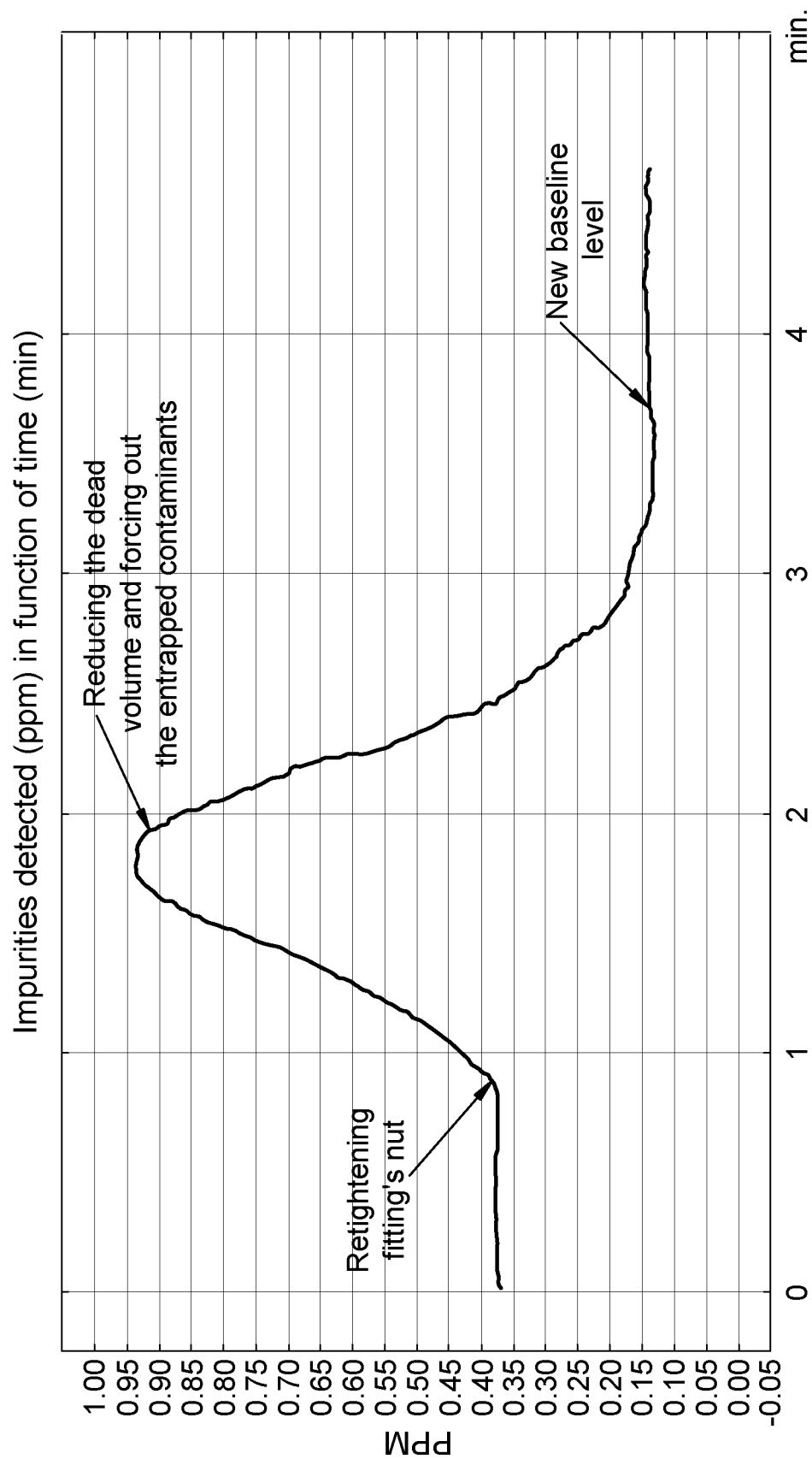
FIG. 5 is a graph showing impurities detected (in ppm) as a function of time, when retightening a prior art double ferrule fitting. (PRIOR ART)
Figure 6:
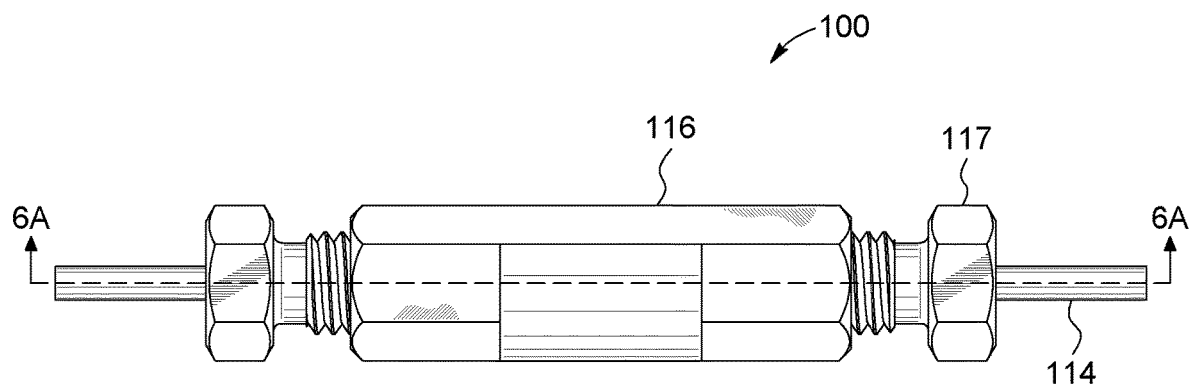
FIG. 6 is a side view of a prior art single ferrule fitting assembly.
Figure 6A:
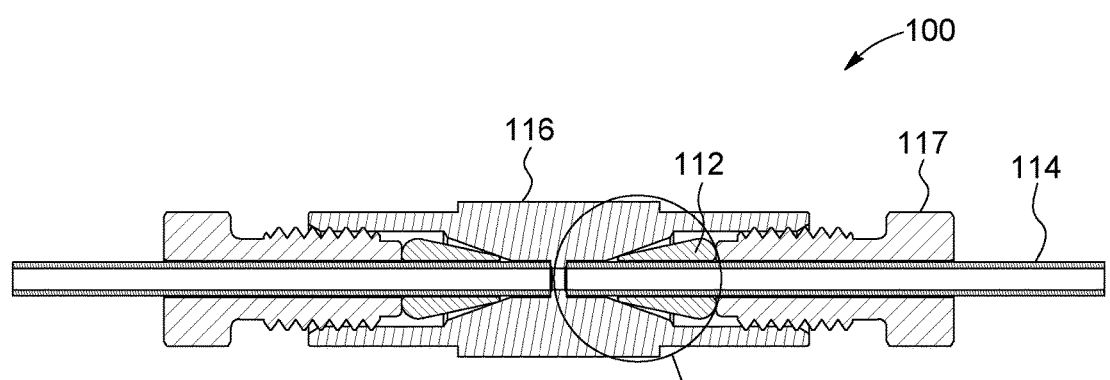
FIG. 6A is a cross-section view of the single ferrule fitting assembly of FIG. 6, taken along line 6A-6A.
Figure 6B:
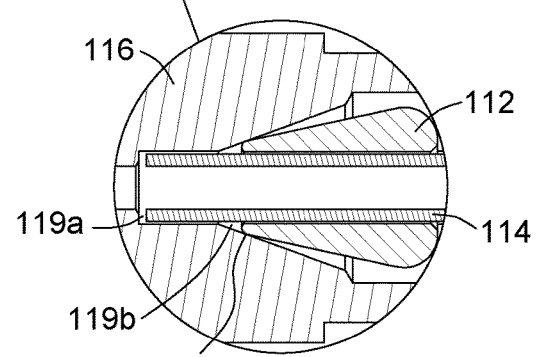
FIG. 6B is a close-up view of a portion of FIG. 6A. (PRIOR ART)

In the following description, similar features in different embodiments have been given similar reference numbers. For the sake of simplicity and clarity, namely so as to not unduly burden the figures with unneeded references numbers, not all figures contain references to all the components and features; references to some components and features may be found in only one figure, and components and features of the present disclosure which are illustrated in other figures can be easily inferred therefrom.

With reference to FIGS. 7, 7A to 7C, 8, and 8A to 8D, a fitting assembly 200 is shown according to an embodiment. Although the described fitting assembly 200 is a union-type fitting, it should be understood that the features of the improved fitting assembly described herein can apply to other types of fitting assemblies or any component part of an analytical system which is adapted to receive a tube locked in place with a compression nut and a ferrule, such as a cap, a valve, a valve cap, a valve body, a sealing plate, an instrument body or frame, an analyzer, sampler or separation module, a sample panel, a fluidic control component, an actuating mechanism and the like.

The fitting assembly 200 includes a fitting component 216, a tube 214, front and rear ferrules 212a, 212b and a nut 217. The tube 214 is secured to the fitting component 216 by the nut 217. The front and rear ferrules 212a, 212b are compressed between the fitting component 216 and the nut 217, causing a swaging 213 of the tube 214 in front of the front ferrule 212a. As a result, the tube 214 is deformed in front of the front ferrule 212a such that its diameter is greater than that of the aperture of the ferrules 212a, 212b through which it was inserted. The tube 214 is thus secured inside the fitting component 216 and is able to resist high pressure and vibration.

As is best shown in FIG. 8A, the fitting component 216 comprises a fitting component body 211 with inner lateral walls 248 defining a fitting component cavity 246. The fitting component cavity 246 has a tube receiving section 250 with a tube receiving section diameter 241, the tube receiving section 250 being sized and configured to receive a tube 214 therein. The inner lateral walls 248 include a tapered section 258 for receiving the front ferrule 212a and biasing it towards the tube 214 as the nut 217 is tightened. In the present embodiment, the fitting component body 211 of the union-type fitting component 216 has first and second ends 242, 244 with a threaded connection 218 for receiving and securing a nut 217. Preferably, the threaded connection 218 is precisely machined and is provided with a surface treatment such as silver. The inner lateral walls 248 define first and second cavities 246a, 246b which respectively open in the first and second ends 242, 244. The cavities 246a, 246b are in fluid communication via a channel 220 extending through the body 211, thus allowing for a fluid communication between tubes 214 respectively secured to the first and second ends 242, 244 of the fitting component 246. The channel 220 has a channel diameter 239 which is preferably smaller than the tube receiving section diameter 241. The fitting component body 211 comprises a radial annular flange 254 at an end of the tube receiving section 250, where the tube receiving section 250 meets the channel 220. The annular flange 254 has a radial thickness corresponding to the difference between the tube receiving section diameter 241 and the channel diameter 239. Although in the present embodiment the cavities 246a and 246b have the same tube receiving section diameter 241, it should be appreciated that in other embodiments their tube receiving section diameters can differ, for example in a reducing fitting component for joining first and second tubes, the second tube having an outer diameter smaller than the outer diameter of the first tube. Also, although in the present embodiment the channel 220 has a uniform channel diameter 239, in alternate embodiments, the channel diameter 239 can vary along the length of the channel 220.

Figure 7:
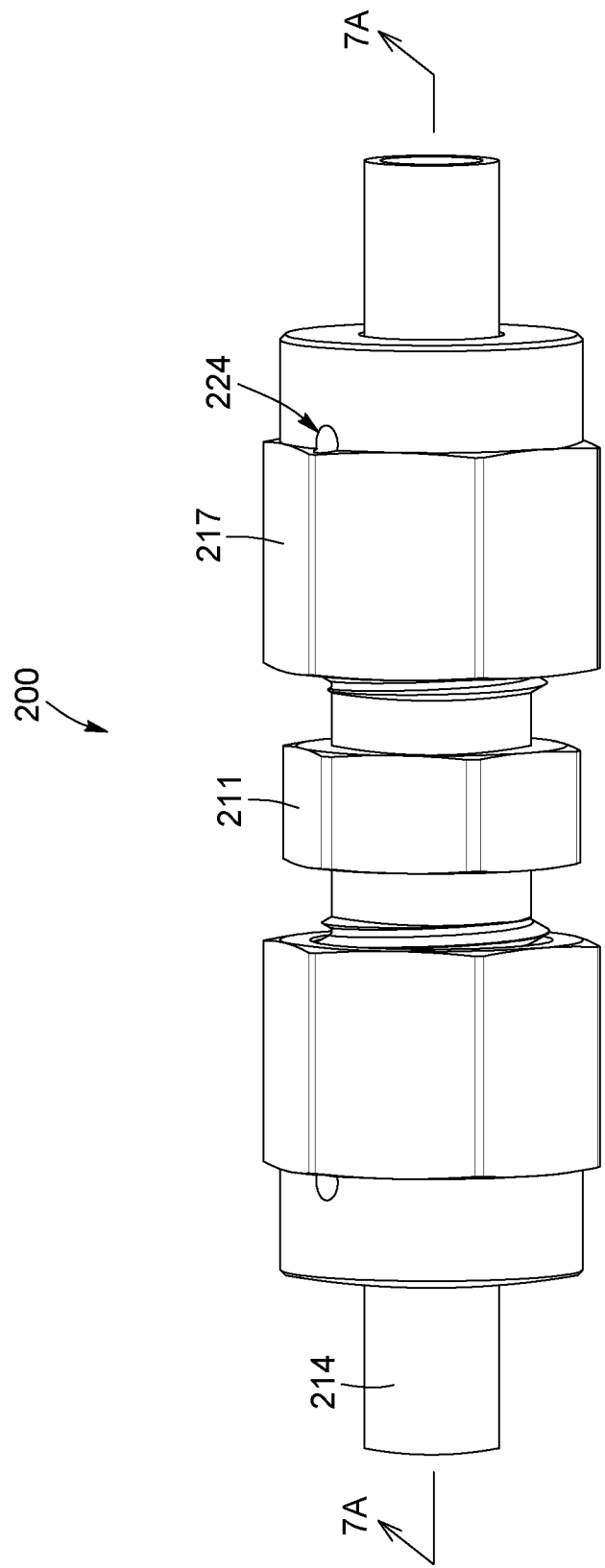
FIG. 7 is a side view of an improved double ferrule union fitting, according to an embodiment.
Figure 7C:
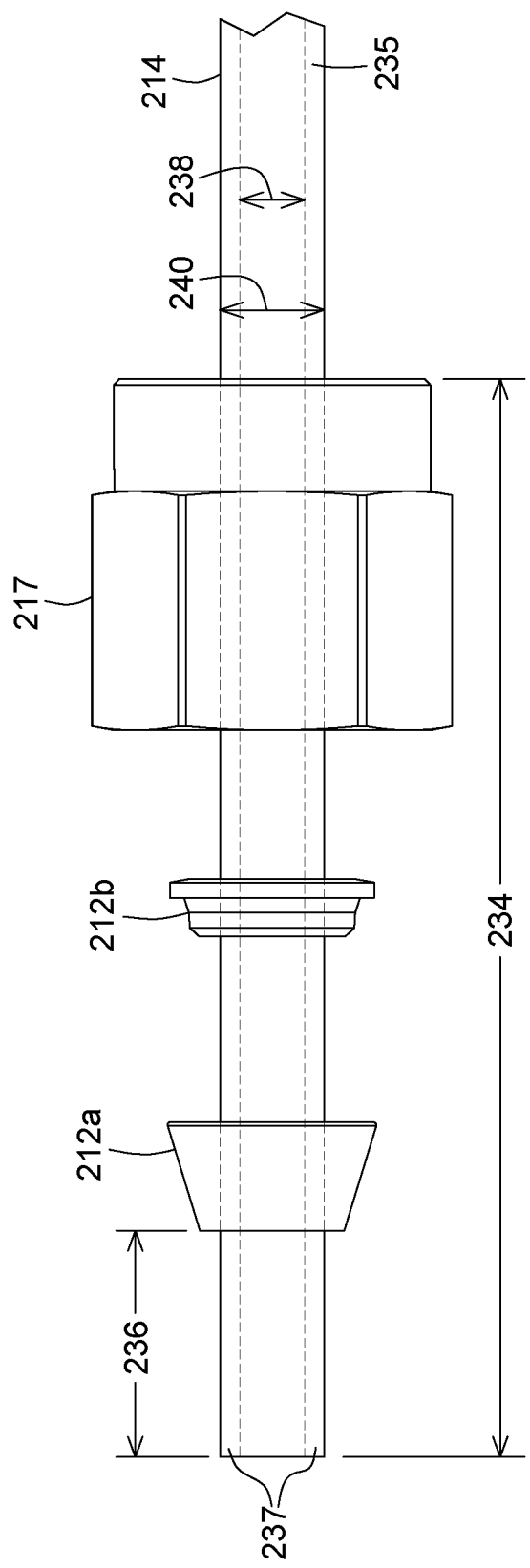
FIG. 7C is a schematic view a tube inserted through ferrules and a nut, for insertion in the fitting of FIG. 7.

As schematically illustrated in FIG. 7C, the tube 214 has tube sidewalls 235 defining an inner diameter 238 and an outer diameter 240. The tube 214 has a tube end 234 for insertion through the nut 217 and ferrules 212a, 212b, and a fit-in end 236 which is a portion of the tube end 234 extending past the front ferrule 212a. To secure the tube 214 to the fitting component 216, the tube end 234 is first inserted through the nut 217 and the ferrules 212a and 212b. The nut 217 is then tightened, causing the ferrules 212a, 212b to compress and deform the tube sidewalls 235. Tightening the nut 217 also pushes the tube end 234 against the fitting component body 211 in the tube receiving section 250. The fit-in end 236 has a radial surface 237 for interfacing with the annular flange 254 of the fitting component body 211. Preferably, the inner diameter 238 of the tube 214 corresponds to the channel diameter 239, thus creating a uniform flow path for gas travelling through the tube 214 and channel 220, and avoiding dead volume. The outer diameter 240 of the tube 214 can also correspond to the tube receiving section diameter 241 to further reduce dead volume and ensure a proper seal.

As is best shown in FIGS. 8B and 8C, the radial annular flange 254 is provided with an annular sealing lip 256 which protrudes towards the cavity 246. The sealing lip 256 is for interfacing with the radial surface 237 of the tube 214 and creating a seal therewith. The sealing lip 256 can be coated with an inert substance 262 softer than the material from which the fitting component body 211 is made. Preferably, the inert substance 262 is gold.

As can be appreciated, the sealing lip 256 allows for a better seal to be created between the tube 214 and the fitting component body 211. In use, when the nut 217 is screwed to the fitting component 216, the ferrules 212a and 212b are compressed and grip the tub 214. As the ferrules 212a, 212b are pushed forward towards the channel 220 of the fitting 216, the radial surface 237 of the tube 214 is compressed against the annular sealing lip 256. The sealing lip 256 is preferably fine so that it distributes the mechanical force on a small area and increases the effective seating force. Preferably still, the tube 214 is made of a material which is softer than the material forming the fitting component body 211. For example, the tube 214 can be made of annealed SS304, while the fitting component body 211 can be made of hardened SS316L. As a result, the sealing lip 256 penetrates the radial surface 237 of the tube 214 and creates a strong metal-to-metal seal therewith. In the illustrated embodiment, the sealing lip 256 is a rounded bump, however it should be understood that in alternate embodiments, the sealing lip 256 can take different shapes to better interface with the radial surface 237 of the tube 214. For example, the sealing lip 256 can comprise one or more sharp peaks or ridges, or can be textured to better grip or penetrate the radial surface 237.

Figure 14:
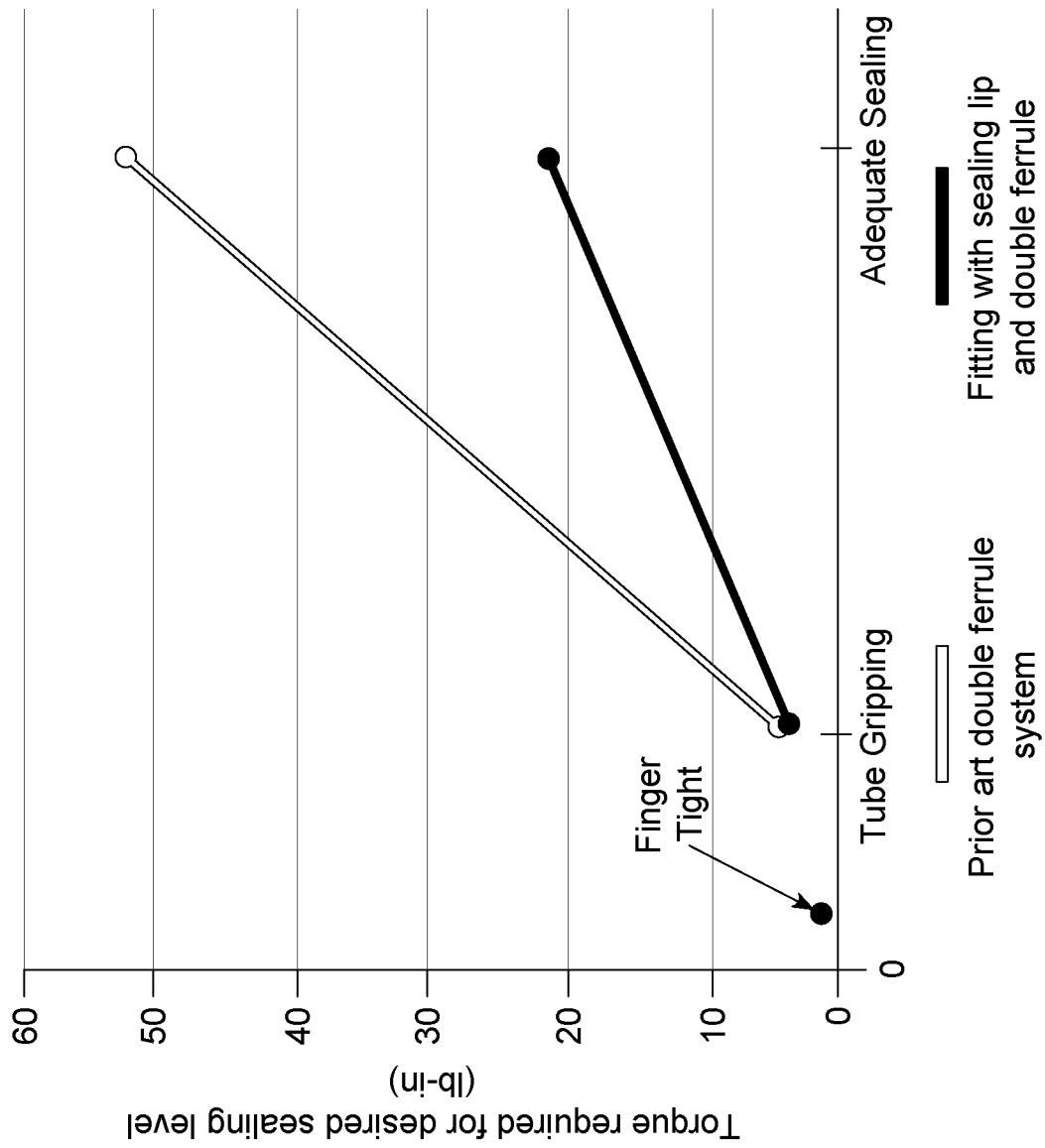
FIG. 14 is a graph comparing the torque required for adequate sealing in the prior art double ferrule system and the a fitting with a sealing lip and double ferrule.

As can be appreciated, the sealing lip 256 reduces the amount of torque required to create an effective seal, which can be nearly finger tight. As shown in the graph of FIG. 14, a fitting with a sealing lip and double ferrule, such as the one shown in FIG. 7 and described herein-above, requires significantly less force (just over 20 lb-in) to achieve an adequate sealing force compared to a double ferrule fitting of the prior art (in excess of 50 lb-in), such as the one shown in FIG. 1. Since less torque is required to create an effective seal, the amount of swaging or deformation of the tube can be reduced. The tube can therefore be more easily removed once the nut is loosened. This can result in fewer scratches with frequent assembly and disassembly, thereby reducing the dead volume in the fitting. What's more, users can avoid the problematic practices discussed above in the background section (i.e.: cutting the tube frontward of the front ferrule or withdrawing the tube before tightening the nut), which they would otherwise need to employ in order to reduce the swaging of the tube in double-ferrule fittings of the prior art.

As can be further appreciated, providing a sealing lip in a double ferrule fitting is advantageous because the resulting fitting is suitable for a wide range of applications. In the past, single ferrule fittings with a sealing lip were preferred for analytical systems due to their reduction of dead volume and tight seal. As discussed in the background section, double ferrule fittings are less desirable for such applications because they are known to suffer from dead volume issues. For industrial applications, however, double ferrule fittings are preferred due to the robustness achieved from the "swaging" of the tube, making them resistant to vibration and high pressure. The improved double ferrule fitting assembly disclosed herein combines the robustness of a double ferrule fitting with the analytical performance of a single ferrule fitting. The improved fitting assembly therefore allows for a single type of fitting to be used in both analytical systems and industrial applications, making it commercially advantageous.

Figure 8:
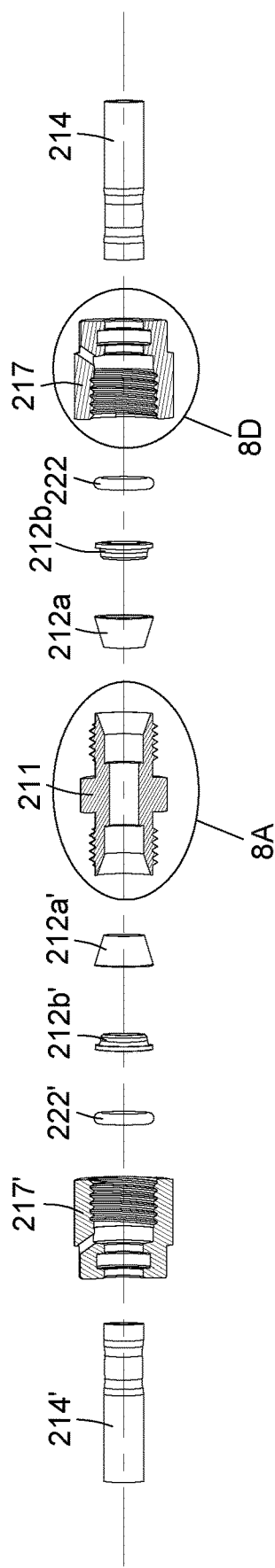
FIG. 8 is an exploded partial cross-section view of the fitting assembly of FIG. 7.
Figure 8D:
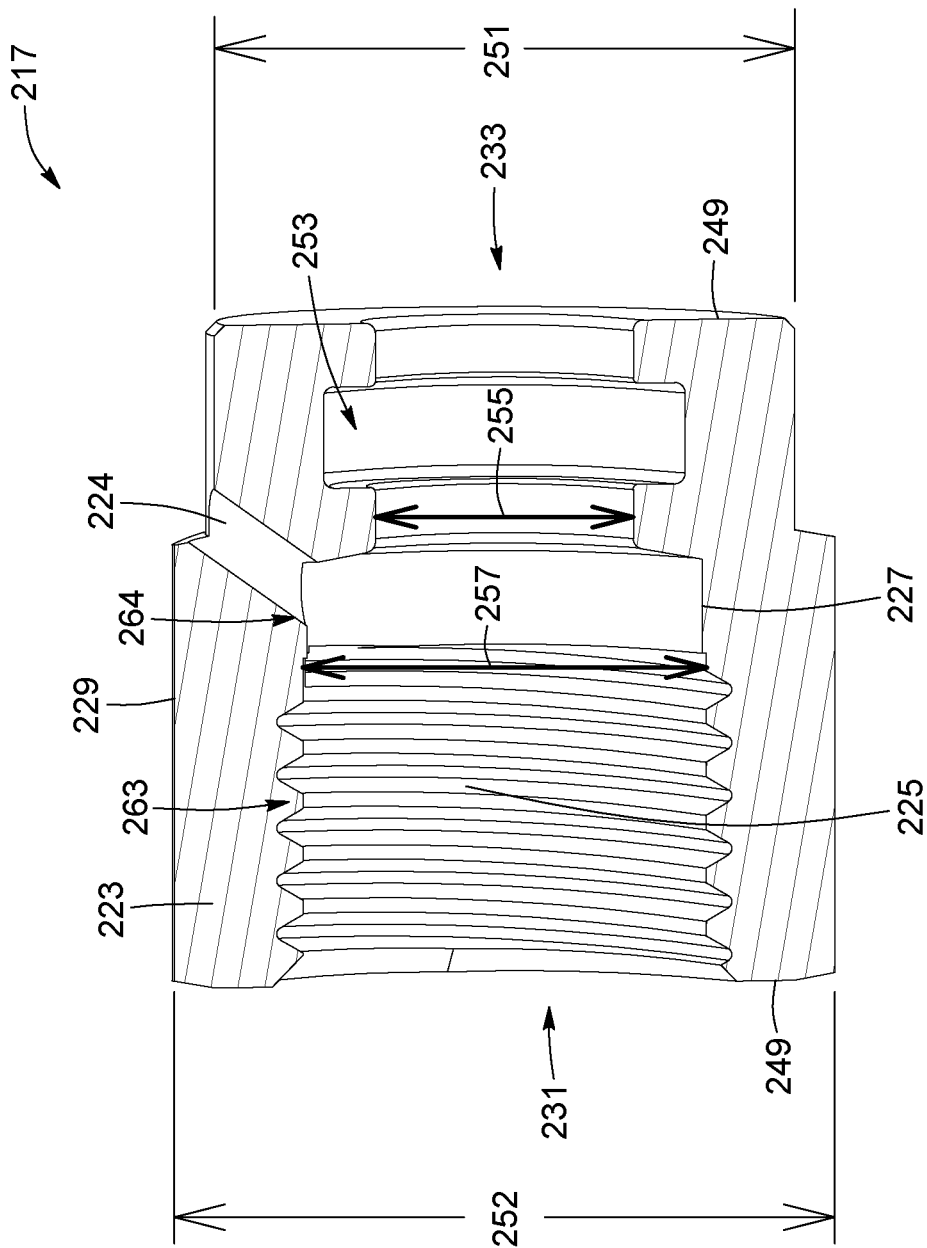
FIG. 8D is a detail view of a nut in the assembly of FIG. 8A.

Referring back to FIGS. 7 to 7C and 8 to 8C, the nut 217 comprises a nut body 223 with a fitting interface end 231 and a tube interface end 233, delimited by terminal faces 249. The nut body 223 comprises inner and outer nut sidewalls 227, 229 extending between the terminal faces 249, the inner sidewall 227 defining a bore 225 which opens at the fitting interface end 231 and the tube interface end 233. In the present embodiment, the fitting interface end 231 is configured to fit around the threaded connection 218 on an end 242, 244 of the fitting component body 211, while the tube interface end 233 is configured to fit around the tube sidewalls 235. The inner nut sidewall 227 therefore has an inner diameter in the fitting interface end 257 sized to accommodate an end 242, 244 of the fitting component body 211, and an inner diameter in the tube interface end 255 sized to accommodate the tube 214. The inner nut sidewall 227 also has a threaded portion 263, and may also have a non-threaded portion 264. Preferably, the threaded portion 263 is precisely machined and is provided with a surface treatment such as silver, and thereby creates a sufficient seal when engaged with the threaded connection 218 of the fitting component body 211. Preferably, the inner sidewall of the nut body comprise the threaded section 263 in a fitting interface end for engaging around a corresponding threaded section in the fitting component body. In the present embodiment, the inner diameter in the fitting interface end 257 is larger than the inner diameter in the tube interface end 255;

however these diameters can vary depending on the configuration of the fitting assembly. The outer nut sidewall 229 has an outer diameter in the fitting interface end 252 and an outer diameter in the tube interface end 251. In the present embodiment, the outer diameter in the fitting interface end 252 is preferably larger than the outer diameter in the tube interface end 251. The outer nut sidewall 229 is also sized and shaped to interface with and be tightened by a wrench or other similar tool. As best shown in FIG. 8D, the outer walls of the nut body comprise a profiled section in the fitting interface end for cooperating with a tightening tool, and a non-profiled section in the tube interface end. Preferably, the channel in the nut body extends between the inner sidewalls and the non-profiled section of the outer sidewalls in the nut body.

When assembled, the tube 214 passes through the bore 255 and out through the tube interface end 233. The fitting interface end 231 receives the ferrules 212a, 212b and the fitting 216, and attaches to the fitting component 216 via a threaded connection 218. When assembled, the nut 217 defines together with the fitting component 216 and tube 214 a leak chamber 226. As can be appreciated, in case of a leak occurring between the tube 214 and fitting component 216, the leak chamber 226 will fill up with gas. Preferably, the nut sidewalls 227 comprise a non-threaded portion 264 for helping to form the leak chamber 226.

Preferably, a sniffing hole 224 is provided to allow detection of gas building up in the leak chamber 226, and thus facilitate the detection of leaks. The sniffing hole 224 is configured to allow fluid communication between the leak chamber 226 and an exterior of the fitting assembly 200. In the present embodiment, the sniffing hole is a channel 224 which extends through the nut body 223, and provides a fluid path between the leak chamber 226 and an exterior of the nut 217. The channel 224 slopes along the length of the nut 217, upward from the fitting interface end 231 towards the tube interface end 233. In an alternate embodiment, however, the channel 224 can have a different orientation. For example, the channel can be sloped in the opposite direction, can be vertical, or can be sloped substantially tangent to the circumference of the nut 217. In the present embodiment, the channel 224 is round. However, in other embodiments, the channel can have a different shape, for example to accommodate or secure different types of measuring tools. In the present embodiment, the channel 224 is straight. In other embodiments, however, the channel 224 can be curved or shaped otherwise to create a more complex path for leaking gas, or to accommodate or secure different types of measuring tools. Preferably, the channel in the nut body open as a sniffing hole on the outer sidewalls of the nut body, the sniffing hole being positioned proximate to a junction of the fitting interface end and the tube interface end. Preferably, the channel in the nut body extends at an oblique angle relative to the bore in the nut body.

The channel 224 opens on one end in the bore 225 in the fitting interface end 231 of the nut body 223 and on the other end on the outer nut sidewall 229 where the fitting interface end 231 meets the tube interface end 233. In an alternate embodiment, the channel 224 can open elsewhere. For example, the channel can open on the outer nut sidewall 229, exclusively in one of the fitting interface end 231 and the tube interface end 233 of the nut body 223. In yet further examples, the channel can open on one of the terminal faces 249 of the nut instead of along the nut sidewall 229. Preferably, the channel 224 opens in the bore 225 in a non-threaded portion 264 of the inner nut sidewalls 227.

However, in alternate embodiments, the channel 224 can open on the inner walls 227 where they are threaded 263.

Figure 15:
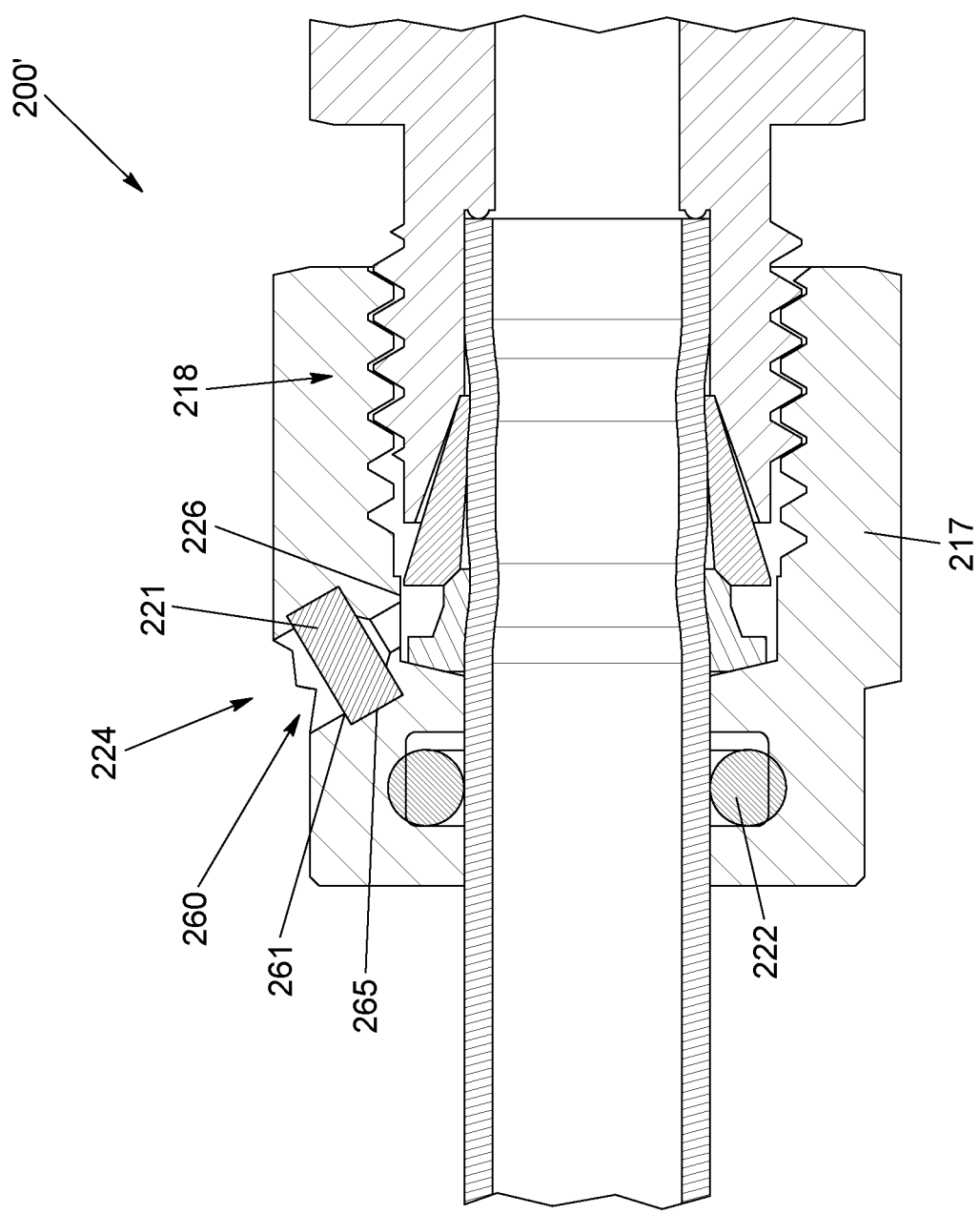
FIG. 15 is a cross section view of half an improved double ferrule union fitting having a septum provided in the sniffing hole for containing leaked gases in the leak chamber.

The channel 224 can further be provided with a gate or sealing element to help contain leaks, allow pressure to build up in the leak chamber 226, and/or create a seal with an input of a measuring instrument, such as a capillary tube inserted into the channel for example. With reference to FIG. 15, an alternate embodiment of a fitting assembly 200' is shown, where the nut 217 is provided with a septum 221 along the channel 224. The septum 221 is preferably a disk-shaped element which is received inside a septum receiving cavity 265 along the channel 224 in the nut 217. Preferably, the septum 221 is made of a material impermeable to gas and serves to temporarily seal the channel 224. Preferably, the septum is pierceable for allowing a probe (or a needle, syringe, capillary tube or the like) to pass therethrough. Preferably still, the septum 221 is self-sealing so that when the probe is inserted, a seal is created around said probe. Likewise, when the probe is removed, the septum 221 closes and seals the channel 224. For example, the septum 221 can be made of a resilient material, such as rubber, and can be provided with a self-sealing central aperture. As can be appreciated, the septum 221 allows containing low pressure leaks inside the leak chamber 226, which can be particularly useful when dealing with toxic gases where even a small leak from the fitting assembly 200 can be a health hazard.

In the present embodiment, the septum 221 is removably inserted in the channel 224. As illustrated, the channel 224 is provided with a widened portion 260 adjacent the cavity 265 for inserting the septum 221. Preferably, the widened portion 260 is narrower than a diameter of the septum 221, requiring the septum to be deformed as it is inserted. The cavity 265 can be wider than the widened portion 260 of the channel 224, thus allowing the septum 221 to expand, and providing a lip 261 against which the septum 221 can abut. In this configuration, the septum 221 can be held in place as pressure builds up in the leak chamber 226. In other embodiments, the septum 221 can be held in the channel 224 by other means. For example, it can be permanently embedded or formed in the nut 217. Preferably, the channel has the widened portion 260 proximate the outer sidewall 229 of the nut body for receiving the septum 221 therein. The widened portion has its inner diameter greater than its inner diameter of the channel 224 proximate the inner sidewall 227 of the nut body. In preferred embodiments, the fitting assembly comprises the septum cavity 265 positioned along the channel 224 for receiving the septum 221 therein, the inner diameter of the cavity being greater than an inner diameter of the channel, requiring the septum 221 to be deformed to be inserted or removed from the cavity 265. The septum is preferably pierceable and self-sealing. Still preferably, the septum is made of a resilient material, such as rubber or an elastomer, for example.

In other embodiments, a removable cap (not illustrated) can also be provided for closing the channel 224 when not in use. The cap can be made of metal, plastic, rubber, or any other suitable material, and can be press fit or screwed into the channel 224.

Although in the sniffing hole 224 is provided in the nut 217, it should be understood that in alternate embodiments, it can be located elsewhere. For example, with reference to FIGS. 13, 13A and 13B, in a single ferrule fitting assembly 500, the sniffing hole 524 can extend through the fitting body 511. The same variations described in relation to the sniffing hole in the nut can also apply to the snuffing hole 524 in the fitting body 511. For example, the sniffing hole 524 can take a different shape, orientation, or can open on a different face of the fitting body 511.

Figure 9:
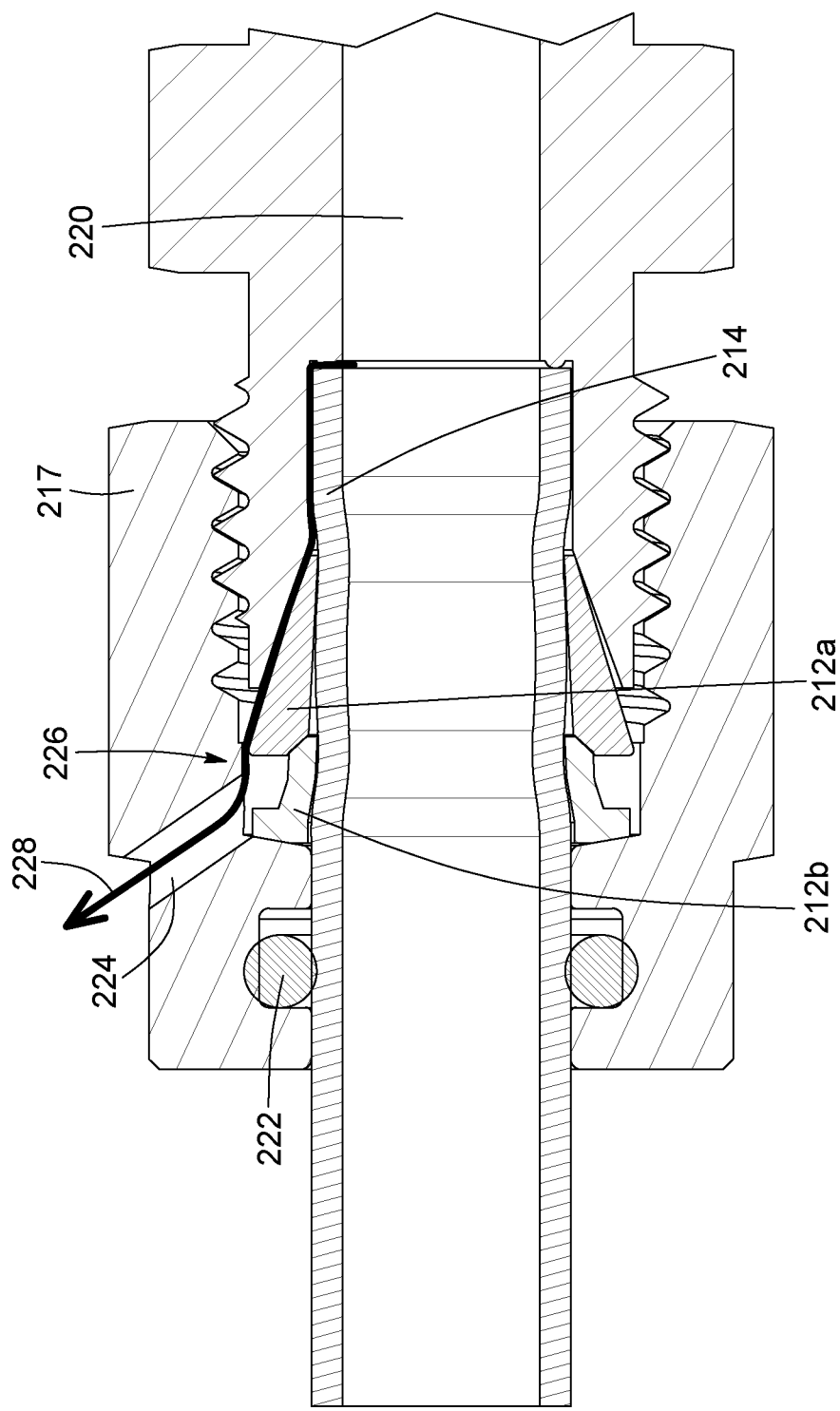
FIG. 9 is a cross section view of a portion of a fitting assembly, showing a gas leak path through the sniffing hole.
Figure 10:
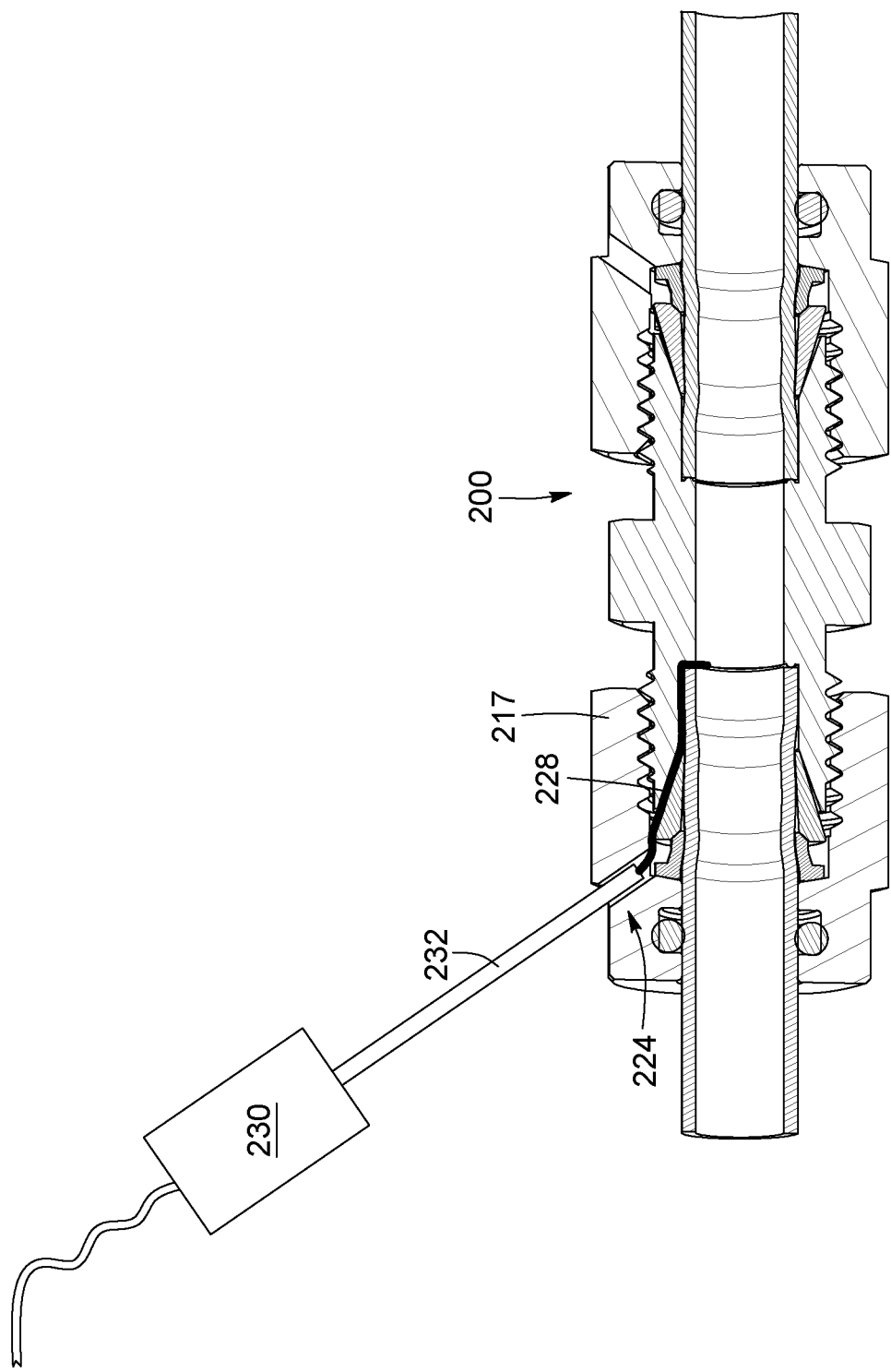
FIG. 10 is a schematic showing a probe assembly for detecting leaks through the sniffing hole.

Referring to FIGS. 9 and 10, in some embodiments the fitting assembly can include a sealing element 222 for containing gas leaks in the chamber 226. In the present embodiment, the sealing element is a sealing ring 222 provided in the tube interface end 233 of the nut 217; the nut 217 comprises a seal chamber 253 for housing the sealing ring 222. The sealing ring 222 is positioned such that it creates a seal between the nut 217 and the tube sidewalls 235. The sealing ring 222 can be made of any suitable sealing material such as rubber or plastic. Although in the present embodiment the sealing element 222 is provided in the tube interface end 233 of the nut 217, it should be understood that it can be located elsewhere so long as it contains leaks to the chamber 226. For example, the sealing ring 222 can additionally or alternatively be provided along the sniffing hole 224. Preferably, the leak chamber comprises a annular region 226, on which the channel 224 opens. The rear ferrule preferably has an annular rim facing the back wall of the nut, and a annular ring surrounding the tube. The annular region 226 surround the rear ferrule and is at least partly delimited by a space between the rim the rear ferrule, and the back side of the front ferrule.

In another example, and with reference to FIGS. 13, 13A and 13B, in a single ferrule fitting assembly 500, the sealing element 522 can be provided at an end of the nut 517 proximate to the chamber 526. Preferably, the fitting assembly comprises the sealing ring in the tube interface of the nut body, for sealing the interface between the tube and the nut and to prevent fluid in the leak chamber from escaping there-through.

As can be appreciated, the described configuration facilitates detection of leaks. With reference to FIG. 9, gas leaking from the channel 220 will be contained in the leak chamber 226 by the sealing ring 222. Gas leaks will therefore be encouraged to follow a path 228 which exists through the sniffing hole 224. With reference to FIG. 10, a probe 230, such as a helium detector, can be used to detect such leaks. In some implementations, a capillary tube 232 can be inserted into the sniffing hole 224 for sampling gas travelling through the leak path 228. In other implementations, a gas detector can be positioned outside the sniffing hole 224 and configured to detect gas exiting therefrom. While the above-described sniffing hole and sealing element are advantageous in a double-ferrule fitting, it should be appreciated that they can also provide some advantages by facilitating leak detection in a single-ferrule fitting, such as the one shown in FIGS. 13, 13A and 13B.

With further reference to FIG. 15, the provision of the septum 221 can further facilitate the detection of leaks. Preferably, the fitting assembly includes the septum 221 in the channel of the nut body, the septum sealing the channel to prevent fluid in the leak chamber from escaping therethrough, while allowing insertion of a probe for detecting fluid in the leak chamber. As can be appreciated, when a leak occurs, the sealing action of the septum 221 together with the sealing action of the sealing element 222 and the threaded connection 218 allow for pressure to build up in the leak chamber 226. Moreover, the sealing action of the septum 221 prevents outside gases from entering the leak chamber 226 through the channel 224, thereby creating an isolated atmosphere in the leak chamber 226. This allows for a probe to more easily and more effectively detect gases in the leak chamber 226 corresponding to leaks from the channel 220.

Figure 11:
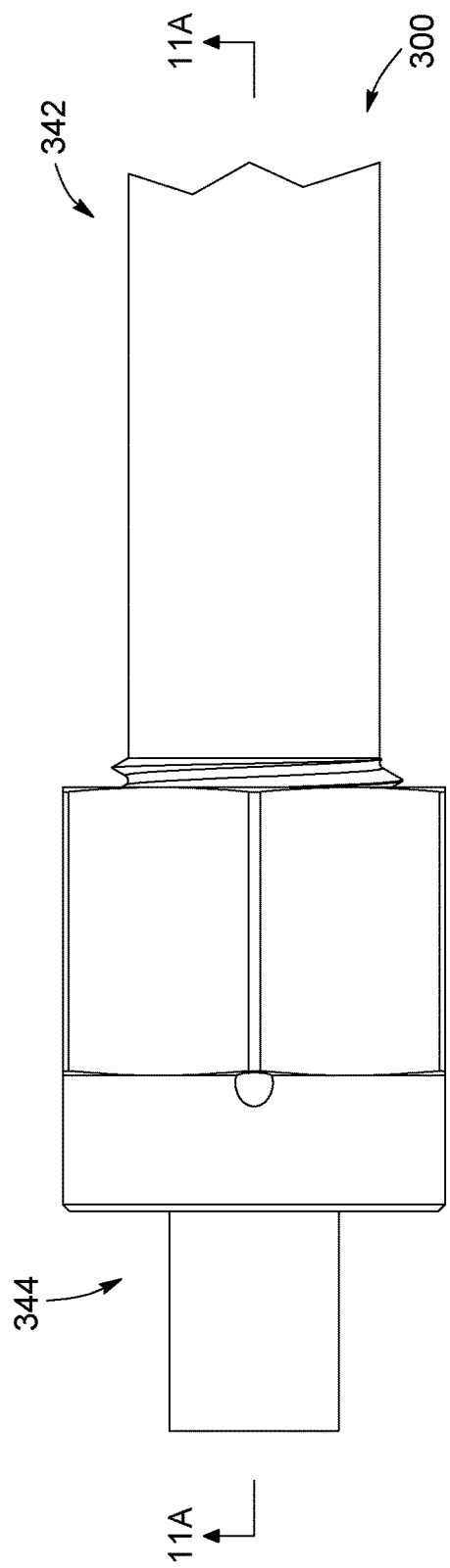
FIG. 11 is a side view of a double ferrule adaptor, according to an embodiment.
Figure 11A:
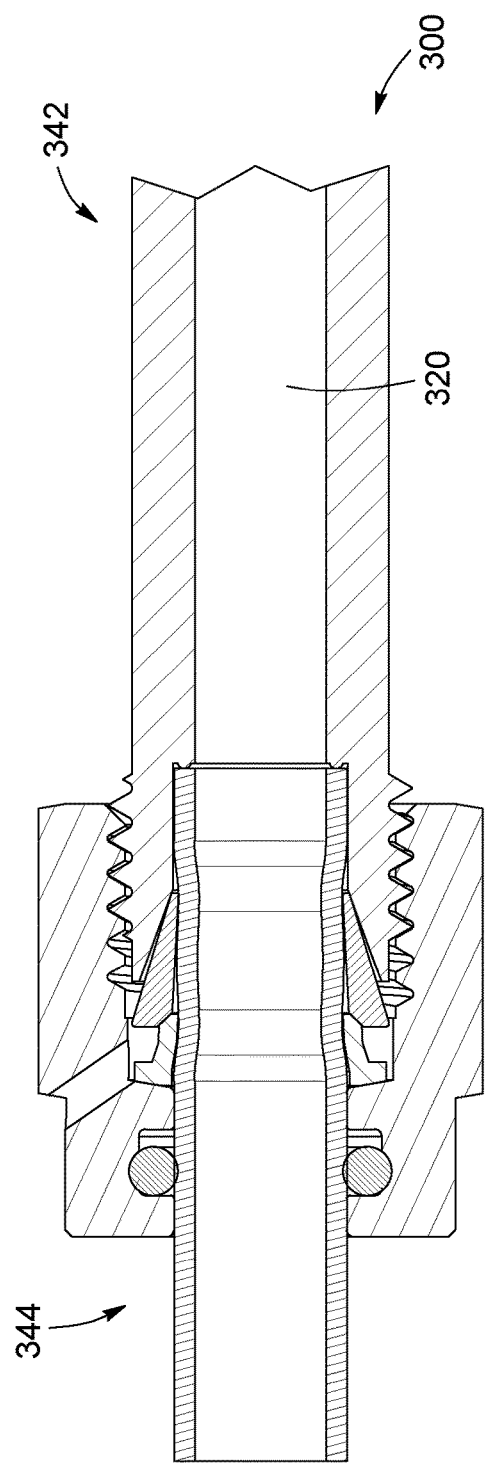
FIG. 11A is a cross section view of the adaptor of FIG. 11 taken along line 11A-11A.
Figure 12:
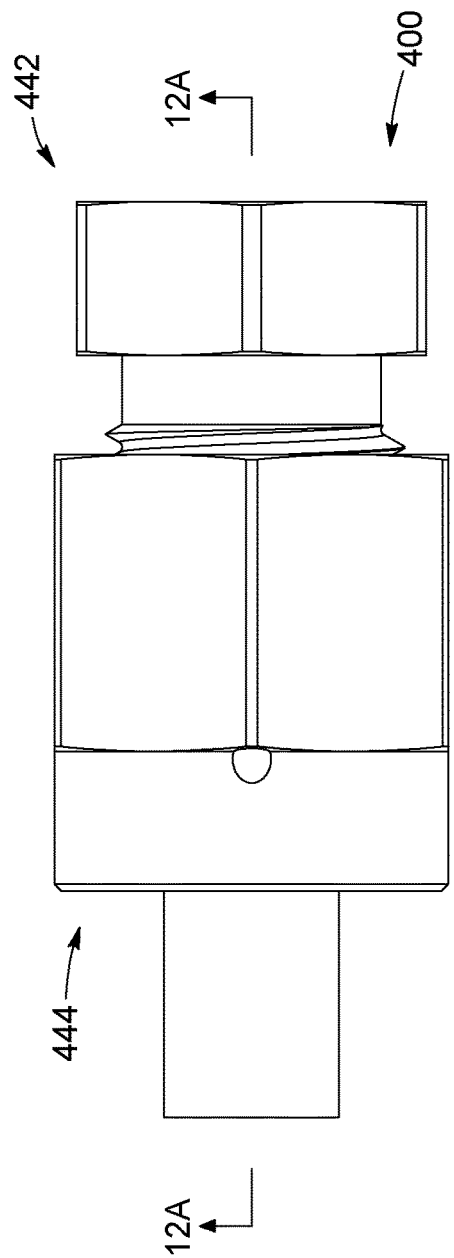
FIG. 12 is a side view of a double ferrule cap, according to an embodiment.
Figure 12A:
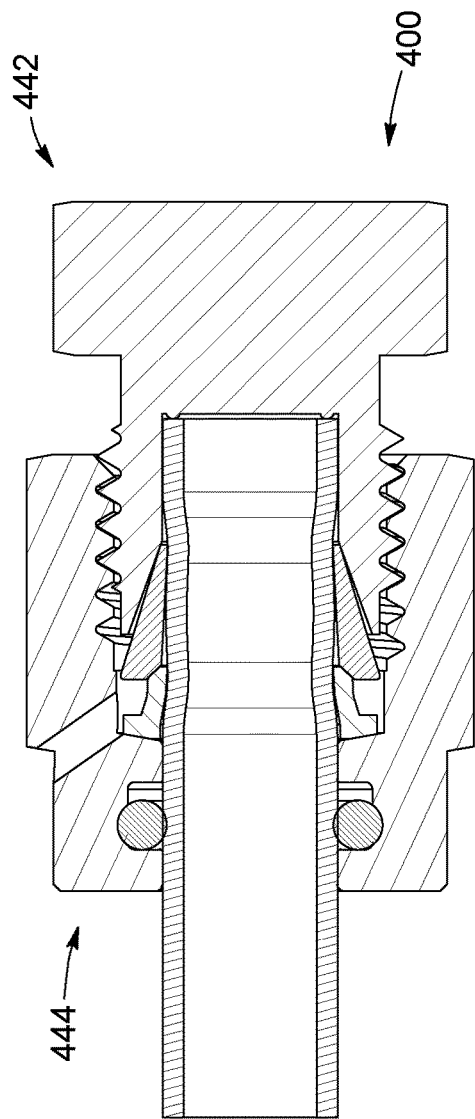
FIG. 12A is a cross section view of the cap of FIG. 12 taken along line 12A-12A.

Although the above-described features were described in relation to a union-type fitting assembly, it should be appreciated that these features can apply to other types of fitting assemblies as well. Preferably, the union-type fitting component has a first end and a second end, the cavity in the fitting component being provided in the first end thereof and comprising a channel 220 (best shown in FIG. 8A) connects the cavity in the first end to a cavity in the second end of the fitting component. With reference to FIGS. 11 and 11A, the fitting assembly 300 shown is provided with a tube extending from the first extremity 342. In this case, the fitting assembly 300 can be used as an adaptor, the tube extending from the body of the fitting component being for connecting to another device. With reference to FIGS. 12 and 12A, the fitting assembly 400 shown can be used as a cap, which is sometimes referred to as a plug. The first extremity 442 is closed, for capping a tube end.

While the fitting components of the fitting assemblies 200, 300 and 400 of FIGS. 7 to 13B are shown with an elongated body and two extremities 242, 244, 342, 344, 442, 444 other embodiments of the fitting assemblies can be provided with different shapes, such as a T-shape or an X-shape, and a fitting component can include more than two extremities, and more than two cavities. Fitting components according to the present invention can also be provided with a threaded joint on one side and with a soldered joint on the other side.

As can be appreciated, the components of the fitting assembly as described above define a leak chamber that can be pressurized, to facilitate analysis of its content, to detect potential leaks. The leak chamber is preferably sealed at least at the proximal/front end of the tube by an annular lip, and also preferably at the distal/back end of the tube with a sealing ring provided in the rear end of the fitting, sealing ring surrounding the tube. Still preferably, a septum can be provided in the channel, such as for example to contains potential leaks when the channel is not connected to a probe at its outer end.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A fitting assembly for use in an analytical system, the fitting assembly being for securing a tube and comprising:
   a fitting component for receiving an end of the tube, said fitting component having a fitting component body comprising:
      inner lateral walls defining a fitting cavity extending axially through the body, the fitting cavity having a tube-receiving section open at a first end for receiving the end of the tube therein; and
      a radial annular flange at a second end of the fitting cavity for abutting a rim of the end of the tube;
   a front ferrule and a rear ferrule, the front and rear ferrules being ring-shaped with a central bore sized to receive the tube there-through; and
   a nut for securing the tube to the fitting component, the nut engaging with the fitting component and biasing the front and rear ferrules to deform the tube, the nut having a nut body with first and second ends, the nut body comprising:
      an inner sidewall and an outer sidewall extending between the first and second ends, the inner sidewall defining a bore opening at the first and second ends, said bore being sized to receive the tube there-through;
      a fitting interface at the first end for engaging with the fitting component;
      a tube interface at the second end for fitting around the tube;
      a channel extending through the nut body, said channel defining a nut body cavity in the nut body having a first opening on the inner sidewall and a second opening of an exterior of the nut body and providing a path for fluid between the bore and an exterior of the nut body; and
      a sealing element positioned at least partially within the nut body cavity or on the second opening of the nut body cavity on the exterior of the nut body;
   wherein, when the nut secures the tube to the fitting component, a leak chamber is defined in a space between the tube, the fitting component and the inner sidewall of the nut body, the leak chamber being in fluid communication with the exterior of the nut body via the channel in the nut body, further wherein the sealing element seals the channel to contain fluid leaking from an interface between the tube and the fitting component within the leak chamber, and to allow pressure to build up in the leak chamber.

2. The fitting assembly according to claim 1, further comprising a sealing ring in the tube interface of the nut body, for sealing an interface between the tube and the nut and preventing fluid in the leak chamber from escaping there-through.

3. The fitting assembly according to claim 1, wherein the sealing element comprises a septum in the channel of the nut body, the septum sealing the channel to prevent fluid in the leak chamber from escaping there-through, while allowing insertion of a probe for detecting fluid in the leak chamber.

4. The fitting assembly according to claim 3, wherein the channel has a widened portion proximate the outer sidewall of the nut body for receiving the septum therein, the widened portion having an inner diameter greater than an inner diameter of the channel proximate the inner sidewall of the nut body.

5. The fitting assembly according to claim 3, further comprising a septum cavity positioned along the channel for receiving the septum therein, an inner diameter of the septum cavity being greater than an inner diameter of the channel, requiring the septum to be deformed to be inserted or removed from the septum cavity.

6. The fitting assembly according to claim 3, wherein the septum is pierceable and self-sealing.

7. The fitting assembly according to claim 3, wherein the septum is made of a resilient material.

8. The fitting assembly according to claim 3, wherein the septum is made of rubber.

9. The fitting assembly according to claim 8, wherein the inner sidewall of the nut body further comprises a non-threaded section in the fitting interface end, adjacent the tube interface end.

10. The fitting assembly according to claim 9, wherein the channel in the nut body extends between the non-threaded section of the inner sidewall and the outer sidewall of the nut body.

11. The fitting assembly according to claim 1, wherein the inner sidewall of the nut body comprises a threaded section in a fitting interface end for engaging around a corresponding threaded section in the fitting component body.

12. The fitting assembly according to claim 11, wherein the threaded section of the inner sidewall is coated with silver.

13. The fitting assembly according to claim 1, wherein the outer walls of the nut body comprise a profiled section in the fitting interface end for cooperating with a tightening tool, and a non-profiled section in the tube interface end.

14. The fitting assembly according to claim 13, wherein the channel in the nut body extends between the inner sidewall and the non-profiled section of the outer sidewall in the nut body.

15. The fitting assembly according to claim 1, wherein the fitting interface end of the nut body has an outer diameter greater than an outer diameter of tube interface end.

16. The fitting assembly according to claim 1, wherein the channel in the nut body extends between the inner sidewall in the fitting interface end, and the outer sidewall in the tube interface end.

17. The fitting assembly according to claim 1, wherein the channel in the nut body open as a sniffing hole on the outer sidewall of the nut body, the sniffing hole being positioned proximate to a junction of the fitting interface end and the tube interface end.

18. The fitting assembly according to claim 1, wherein the channel in the nut body extends at an oblique angle relative to the bore in the nut body.

19. The fitting assembly according to claim 1, further comprising an annular sealing lip protruding from the radial annular flange of the fitting component, for interfacing with a radial surface at the end of the tube and forming a seal therewith.

20. The fitting assembly according to claim 19, wherein the sealing lip is coated with an inert substance.

21. The fitting component according to claim 20, wherein the inert substance is softer than the fitting component.

22. The fitting assembly according to claim 21, wherein the inert substance comprises gold.

23. The fitting assembly according to claim 1, wherein the fitting component is a union-type fitting component with a first end and a second end, the fitting cavity in the fitting component being provided in the first end thereof and comprising a channel connecting a first fitting cavity portion in the first end to a second fitting cavity portion in the second end of the fitting component.

24. The fitting component according to claim 23, wherein an inner diameter of the channel in the fitting component is smaller than an inner diameter of the tube receiving section of the cavity in the fitting component.

25. A method for detecting a leak in a fitting assembly, the method comprising the steps of:
   a. securing a tube to a fitting component via a nut, the tube extending through a central bore in the nut, and the nut engaging with the fitting component to bias an end of the tube towards the fitting component, wherein the nut has a body comprising an inner sidewall and an outer sidewall, the inner sidewall defining the bore, the nut body further comprising a channel extending through the nut body, said channel defining a nut body cavity in the nut body having a first opening on the inner sidewall and a second opening of an exterior of the nut body, and providing a path for fluid between the central bore and an exterior of the nut body;
   b. passing fluid through the tube;
   c. directing fluid leaking from an interface between the end of the tube and the fitting component into a leak chamber in an interior portion of the nut, by sealing an interface between the tube and the nut, by sealing an interface between the nut and the fitting component, and by temporarily sealing the channel via a sealing element positioned at least partially within the nut body cavity or on the second opening of the cavity on the exterior of the nut body;
   d. sampling fluid from the leak chamber via the channel; and
   e. determining whether the fluid sampled from the leak chamber contains traces of the fluid passed through the tube, the presence of said traces indicating the existence of the leak in the fitting assembly.

* * * * *